US011120015B2

(12) United States Patent
Kim et al.

(10) Patent No.: US 11,120,015 B2
(45) Date of Patent: Sep. 14, 2021

(54) IMPORTING DATA USING A MOBILE COMPUTING DEVICE

(71) Applicant: salesforce.com, inc., San Francisco, CA (US)

(72) Inventors: Yuseung Kim, San Francisco, CA (US); Behzad Farhang Richey, Los Angeles, CA (US); Edward C. Mengel, III, San Francisco, CA (US); Sachin Desai, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 760 days.

(21) Appl. No.: 14/874,616

(22) Filed: Oct. 5, 2015

(65) Prior Publication Data

US 2017/0097956 A1    Apr. 6, 2017

(51) Int. Cl.
| | |
|---|---|
| *G06F 16/24* | (2019.01) |
| *G06F 16/242* | (2019.01) |
| *G06F 16/248* | (2019.01) |
| *G06F 16/25* | (2019.01) |

(52) U.S. Cl.
CPC ........ *G06F 16/2428* (2019.01); *G06F 16/248* (2019.01); *G06F 16/254* (2019.01)

(58) Field of Classification Search
CPC ........ G06F 17/30398; G06F 17/30554; G06F 17/30563; G06F 16/248; G06F 16/2428
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |

(Continued)

OTHER PUBLICATIONS

U.S. Appl. No. 13/986,251, filed Apr. 16, 2013.

*Primary Examiner* — Alford W Kindred
*Assistant Examiner* — Tiffany Thuy Bui
(74) *Attorney, Agent, or Firm* — Dergosits & Noah LLP; Todd A. Noah

(57) ABSTRACT

Some embodiments of the present invention include a method for importing one or more datasets using a computing system with a small display screen. The data in the one or more datasets may then be used for data analysis using the small display screen. The method includes determining one or more field identifiers and associated field type information for one or more fields of the dataset to be imported into a mobile computing system. The one or more field identifiers and associated field type information are displayed on a display screen of the mobile computing system using a graphical user interface. The dataset is then imported using the determined field identifiers and associated field type information based on receiving a confirmation to import.

16 Claims, 22 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 * | 9/2012 | Beaven | G06Q 10/0637 |
| | | | 709/204 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,621,382 B1 * | 12/2013 | Young | G06Q 10/107 |
| | | | 715/780 |
| 8,646,103 B2 | 2/2014 | Jakobson et al. | |
| 8,676,901 B1 * | 3/2014 | Nicolaou | H04L 51/08 |
| | | | 709/203 |
| 9,128,995 B1 * | 9/2015 | Fletcher | G06F 16/26 |
| 2001/0044791 A1 | 11/2001 | Richter et al. | |
| 2002/0072951 A1 | 6/2002 | Lee et al. | |
| 2002/0082892 A1 * | 6/2002 | Raffel | G06Q 10/063 |
| | | | 705/7.26 |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 * | 8/2003 | Huang | G06F 17/30578 |
| | | | 717/171 |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 * | 9/2004 | Lee | G06F 9/542 |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0076086 A1 * | 4/2005 | Budd | G06Q 10/107 |
| | | | 709/206 |
| 2005/0091098 A1 | 4/2005 | Brodersen et al. | |
| 2006/0022841 A1 * | 2/2006 | Hoiness | G01D 4/006 |
| | | | 340/870.02 |
| 2009/0063415 A1 | 3/2009 | Chatfield et al. | |
| 2009/0100342 A1 | 4/2009 | Jakobson | |
| 2009/0119678 A1 * | 5/2009 | Shih | G06Q 10/10 |
| | | | 719/313 |
| 2009/0177744 A1 | 7/2009 | Marlow et al. | |
| 2009/0203364 A1 * | 8/2009 | Cedo Perpinya | H04L 67/34 |
| | | | 455/414.1 |
| 2011/0173587 A1 * | 7/2011 | Detwiller | G06F 8/20 |
| | | | 717/109 |
| 2012/0233137 A1 | 9/2012 | Jakobson et al. | |
| 2012/0239754 A1 * | 9/2012 | Vuong | H04W 4/18 |
| | | | 709/206 |
| 2012/0265655 A1 * | 10/2012 | Stroh | G06Q 40/00 |
| | | | 705/30 |
| 2012/0294352 A1 * | 11/2012 | Koum | H04N 21/234309 |
| | | | 375/240.01 |
| 2013/0103417 A1 * | 4/2013 | Seto | G16H 10/60 |
| | | | 705/2 |
| 2013/0204645 A1 * | 8/2013 | Lehman | G06Q 40/08 |
| | | | 705/4 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0019842 A1 * | 1/2014 | Montagna | G06F 17/246 |
| | | | 715/227 |
| 2014/0359537 A1 | 12/2014 | Jakobson et al. | |

(56) References Cited

U.S. PATENT DOCUMENTS

| | | |
|---|---|---|
| 2015/0007050 A1 | 1/2015 | Jakobson et al. |
| 2015/0095162 A1 | 4/2015 | Jakobson et al. |
| 2015/0106246 A1* | 4/2015 | Krishna ............... G06Q 20/40 705/30 |
| 2015/0172563 A1 | 6/2015 | Jakobson et al. |
| 2015/0201062 A1* | 7/2015 | Shih ................. H04M 1/72552 455/564 |
| 2015/0286452 A1* | 10/2015 | Kim ..................... G06F 3/1209 358/1.13 |

* cited by examiner

IMPORTING DATA USING A MOBILE COMPUTING DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to mobile analytics and the importing of data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

There are numerous tools for connecting and importing data in BI (Business Intelligence) Analytics industry. However all of them are designed and optimized for desktop platform for large monitors with keyboard input. Analysts and data scientists are used to do their jobs on desktop because there is no existing tools or techniques to perform such tasks using mobile computing systems. This is inefficient when mobile computing systems with small display screens such as smart phones are more commonly used. Thus, there is a need for a more convenient and user-friendly technology for enabling connecting and importing data for analysis using a computer system having limited screen space, such as a smartphone or other mobile computing systems.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
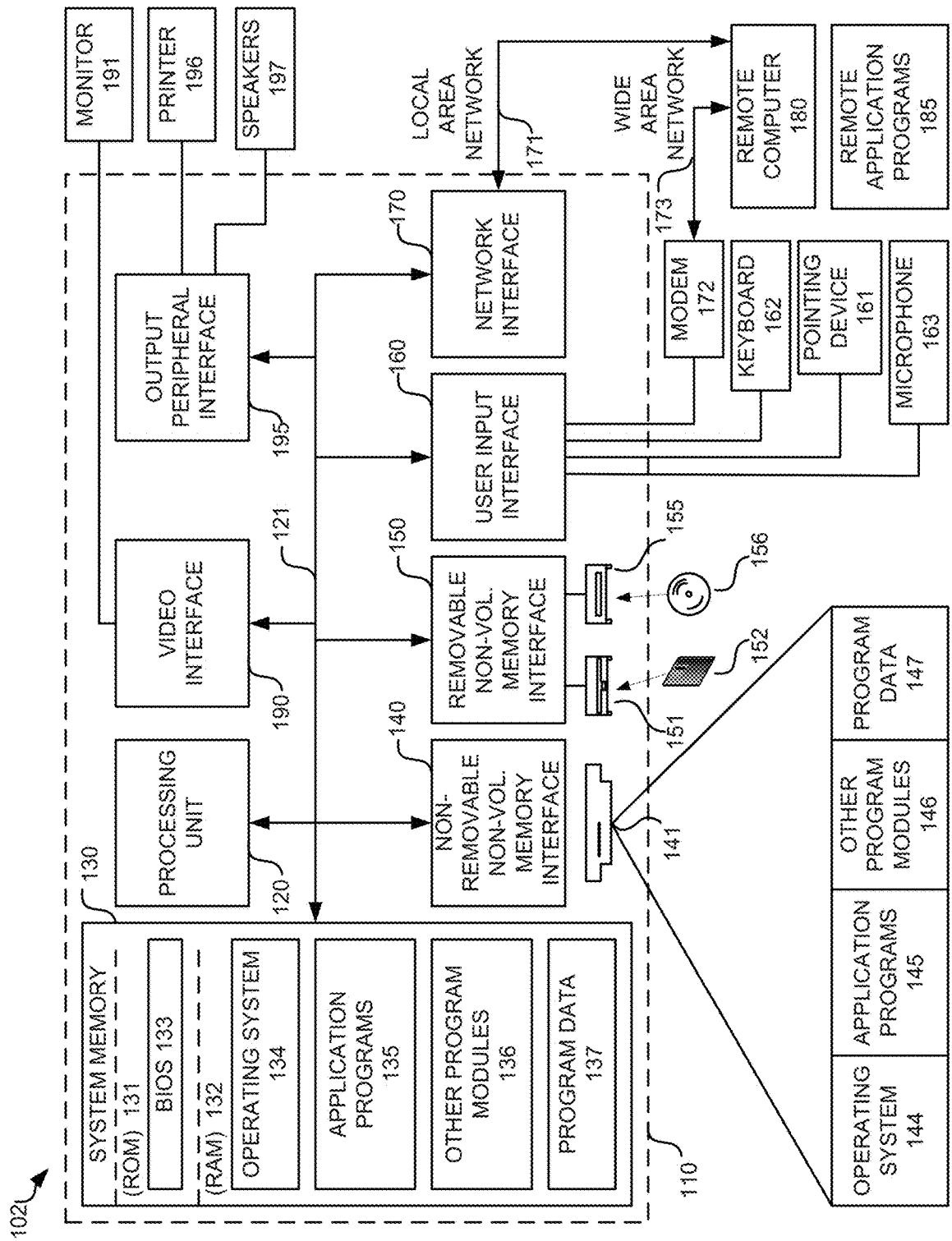
FIG. 1 shows a diagram of an example computing system 102 that may be used with some embodiments of the present invention.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

As used herein, the term "mobile computing system" refers to a smartphone, smartwatch, tablet computer, notebook or laptop computer, handheld computer, mobile Internet device, wearable technology, or other mobile electronic device that includes processing and display capability.

For some embodiments, methods and systems for importing one or more datasets using a computing system with a small display screen. The data in the one or more datasets may then be used for data analysis using the small display screen. The method includes determining one or more field identifiers and associated field type information for one or more fields of the dataset to be imported into a mobile computing system. The one or more field identifiers and associated field type information are displayed on a display screen of the mobile computing system using a graphical user interface. The dataset is then imported using the determined field identifiers and associated field type information based on receiving a confirmation to import.

The disclosed embodiments may include a method for importing data from a dataset using a mobile computing system. The method includes determining one or more field identifiers and associated field type information for one or more fields of the dataset to be imported into a mobile computing system. The one or more field identifiers and associated field type information are displayed on a display screen of the mobile computing system using a graphical user interface. The dataset is then imported using the determined field identifiers and associated field type information based on receiving a confirmation to import.

The disclosed embodiments may include an apparatus for importing data from a dataset using a mobile computing system. The apparatus includes a processor and one or more stored sequences of instructions which, when executed by the processor, cause the processor to determine one or more field identifiers and associated field type information for one or more fields of a first dataset to be imported into a mobile computing system, to display the one or more field identifiers and associated field type information on a display screen of the mobile computing system using a graphical user interface, and to import the first dataset using the determined field identifiers and associated field type information based on receiving a confirmation to import.

The disclosed embodiments may include a machine-readable medium carrying one or more sequences of instructions for displaying information, which instructions, when executed by one or more processors, causes the one or more processors to determine one or more field identifiers and associated field type information for one or more fields of a first dataset to be imported into a mobile computing system, to display the one or more field identifiers and associated field type information on a display screen of the mobile computing system using a graphical user interface, and to import the first dataset using the determined field identifiers and associated field type information based on receiving a confirmation to import.

The disclosed embodiments may be related to importing one or more datasets using a display screen with limited screen space such as a display screen of a mobile computing system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be used by a user to view information associated with a multi-tenant database environment. For example, the multi-tenant database environment may be associated with the services provided by Salesforce.com®. The computing system 102 may also be used to import one or more datasets that may be used for data analysis using the display screen of the computing system 102.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
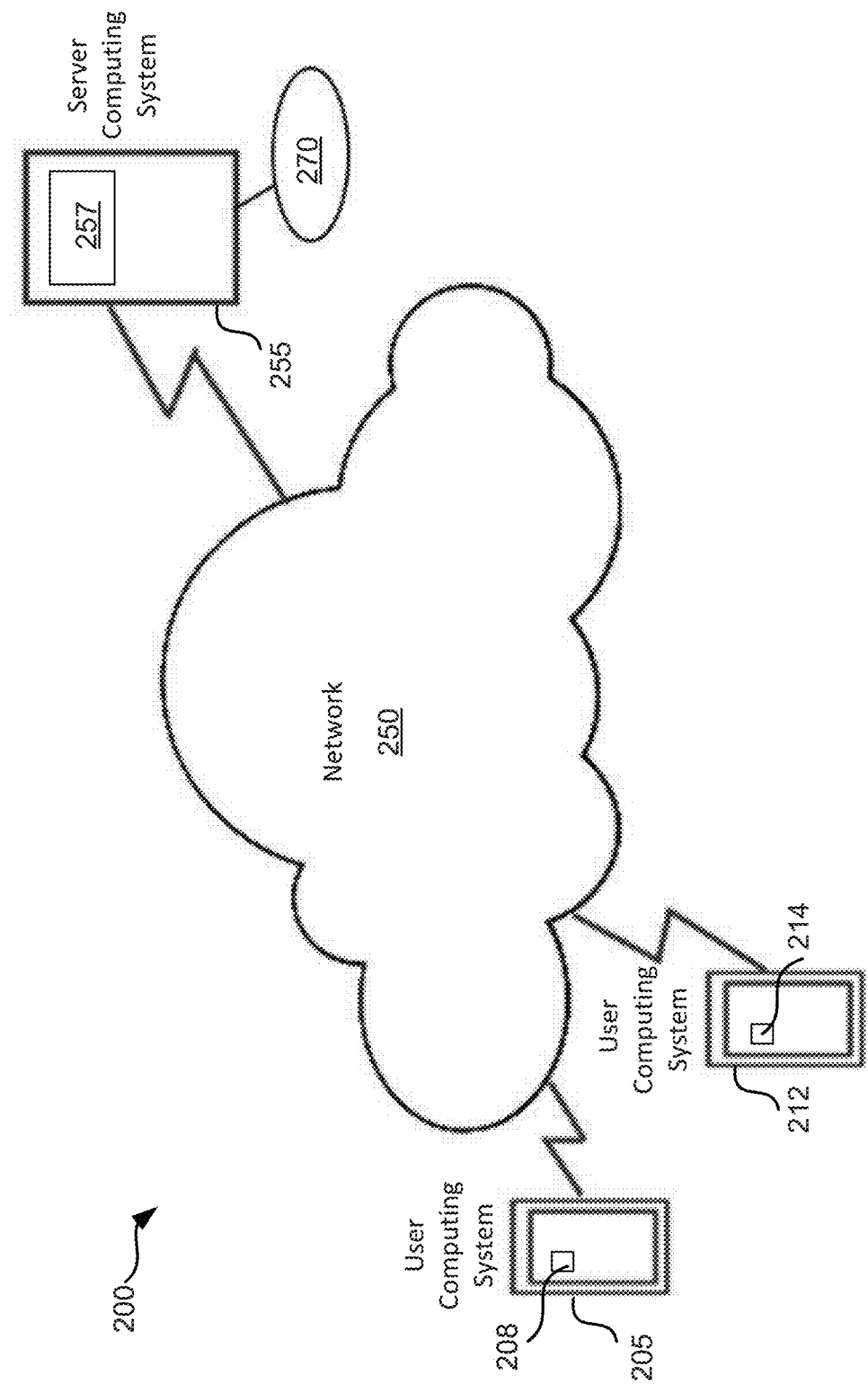
FIG. 2 shows a diagram of an example network environment that may be used with some embodiments of the present invention.

FIG. 2 shows a diagram of an example network environment that may be used with some embodiments of the present invention. Network environment 200 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with server computing system 255 via the network 250.

The computing systems 205 may include application module 208. A user may use the computing system 205 and the application module 208 to connect to and communicate with the server computing system 255 and log into application 257 (e.g., a Salesforce.com® application). The server computing system 255 may be coupled with database 270. The server computing system 255 may be associated with an entity (e.g., Salesforce.com®). The user may be associated with a customer of the entity.

The user may use the computing system 205 to import files or dataset and to view data associated with a dataset. The dataset may be received by the user as an attachment of an email via the network 250. The attachment may be in a zip format and may be unzipped into one or more datasets. The unzipped datasets may be stored in a storage area associated with the computing system 205. The datasets may subsequently be uploaded to the server computing system 255 and stored in a storage area such as, for example, the database 270.

Figure 3:
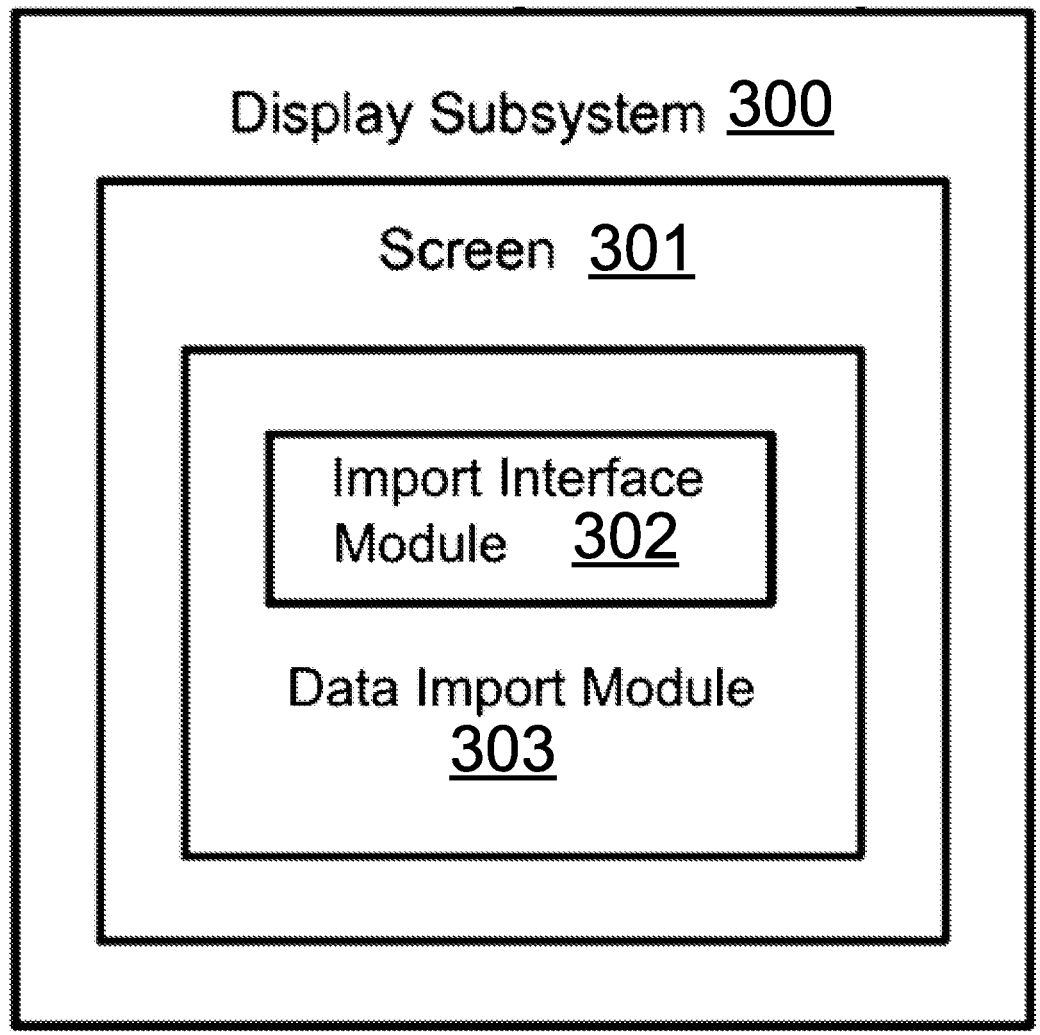
FIG. 3 shows an example display subsystem, in accordance with some embodiments.

FIG. 3 shows an example display subsystem, in accordance with some embodiments. Display subsystem 300 may be associated with a computing system that is used to enable importing data. The display subsystem 300 represents hardware (such as display devices) and software (such as drivers) components that provide a display having visual, tactile, or both elements for a user to interact with the computing system. The display subsystem 300 may include a display screen 301 operable to display an import interface to enable importing data.

The computing system includes a data import module 303 configured to enable importing data using a display screen with limited screen space. The computing system includes an import interface module 302 configured to display one or more user interfaces on the display screen to enable importing data. The one or more user interfaces may display field identifiers associated with the data to be imported and field-related information for the data to be imported. The import interface module 302 may be included in the data import module 303, or it may be independent of the data import module 303.

Figure 4A:
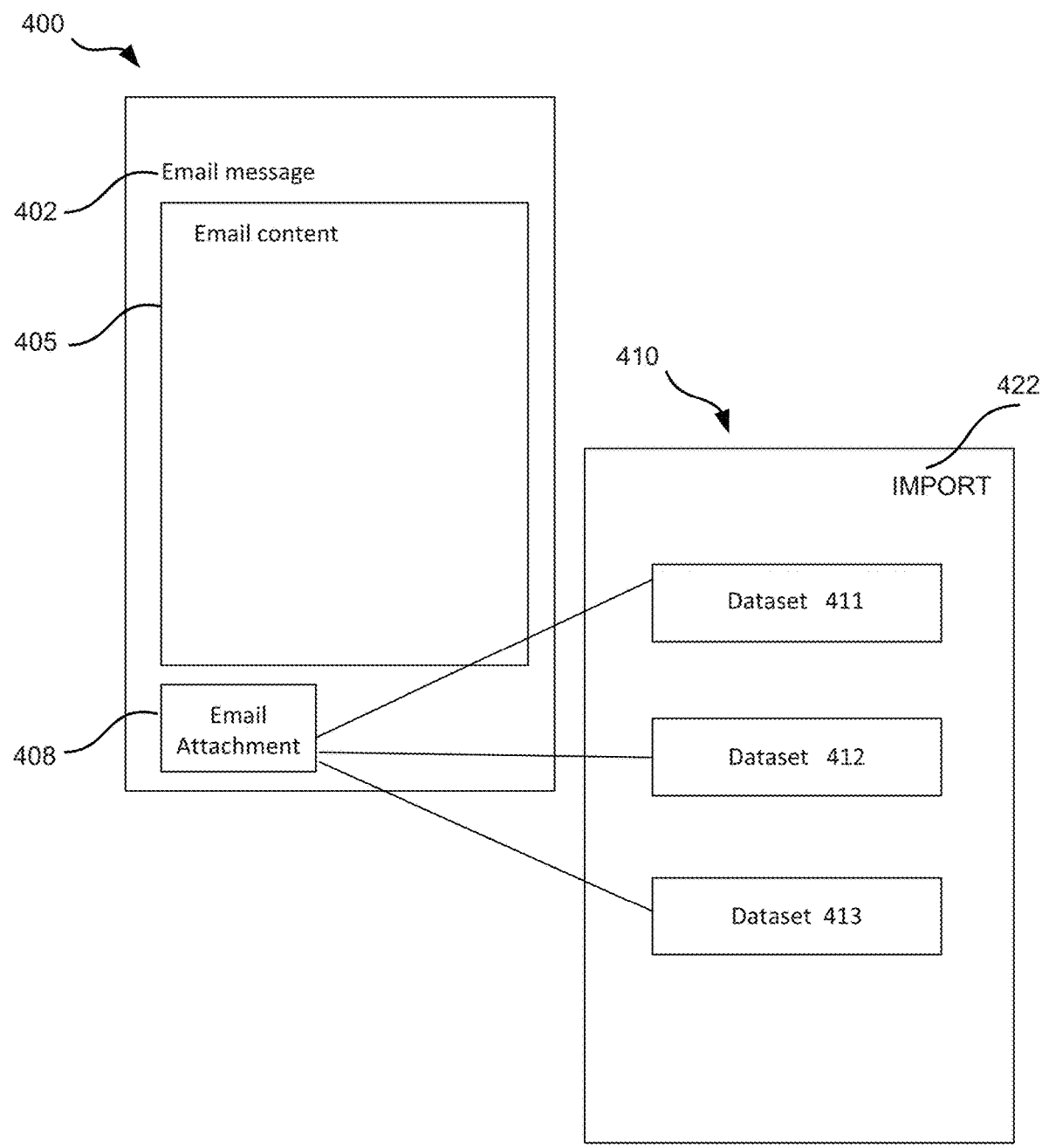
FIG. 4A shows an example of datasets to be imported, in accordance with some embodiments.

FIG. 4A illustrates an example display screen that includes an email having an attachment to be imported, in accordance with some embodiments. A computing system may be a mobile computing system and may have a small display screen. Display screen 400 may display an email message 402 with its email content 405 and attachment 408. The attachment 408 may be a zipped file and may be imported into a storage area of the mobile computing system when opened. For example, the attachment may include data that may be used for analysis such as business intelligence data. Importing the data may be initiated by opening an email attachment such as, for example, the attachment 410. Typically, when an email attachment is opened, the user has the option to save the dataset associated with the attachment, and the dataset would be saved as is or in its original format. For some embodiments, opening the attachment may cause one or more datasets included in the attachment to be opened by the data import module 303.

Display screen 410 shows an example of three datasets 411-413 that may be included in the attachment 408 after it is unzipped. If the zipped file only includes one dataset, then the display screen 410 would only show the dataset 411. It may be noted that although FIG. 4A illustrates importing a dataset by opening an attachment of an email message, other methods of importing the dataset may also be used. For example, the dataset may be transmitted to the computer system from another computer system using a wireless protocol such as blue tooth, etc.

Each dataset may include field identifiers and data associated with the fields. For example, the dataset may be a comma separated values (CSV) dataset which allows its data to be saved in a table structured format. A CSV dataset may include a record that includes field identifiers and one or more records that include field values corresponding to the field identifiers, with each value separated by a comma. A dataset may not necessarily has to be a CSV dataset as long as it is in a format that enables the data import module 303 to determine the field identifiers, the associated field type information, and the field values. For some embodiments, the data import module 303 may automatically determine the field identifier and field type information for each field in a dataset to be imported. For example, when the data import module 303 determines that information related to a particular field is consistently date information, the data import module 303 may associate that field with "date" field type.

Figure 5A:
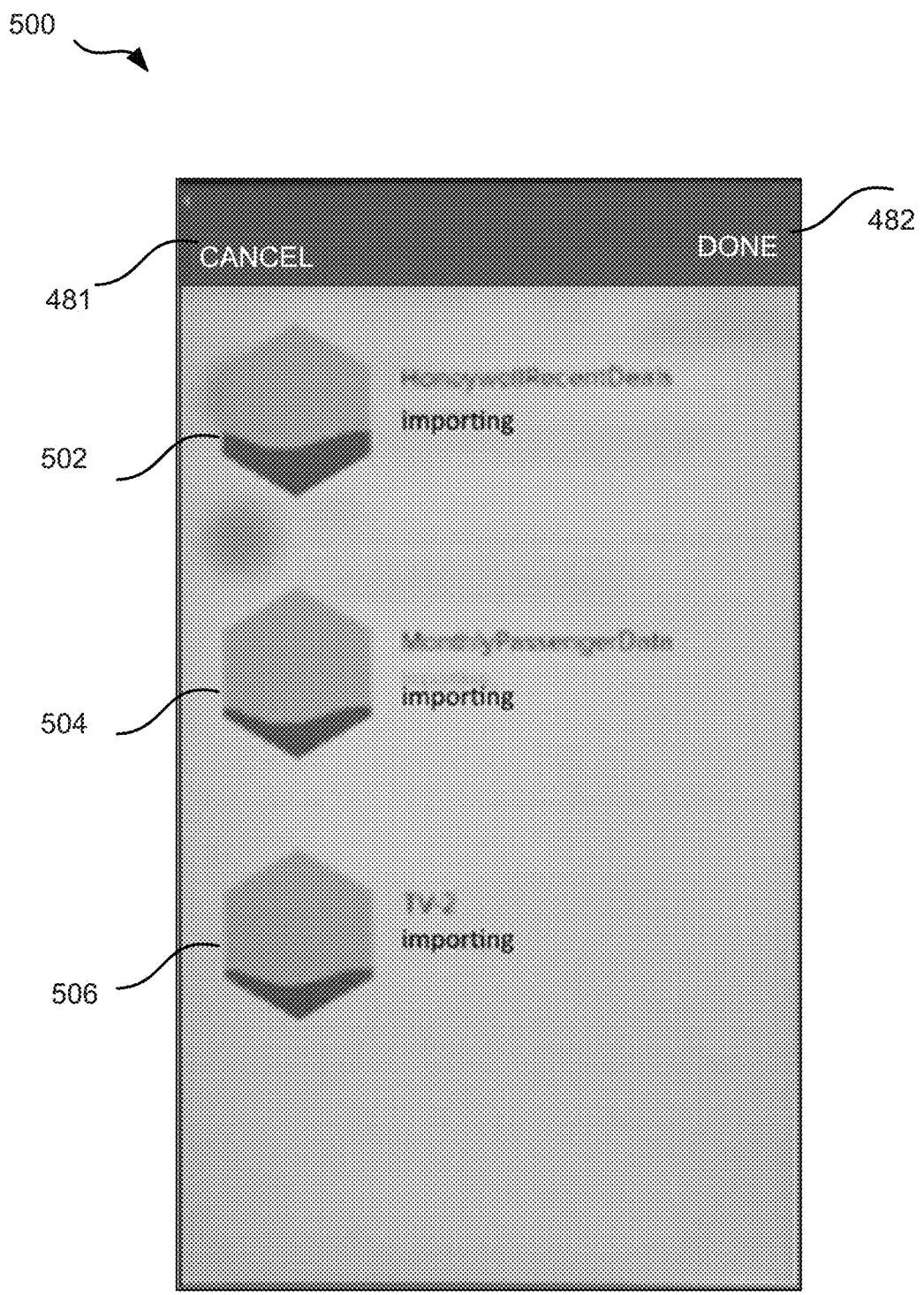
FIGS. 5A through 5D show examples of display screens of a mobile computing system that convey importing progress using dynamic water mark, in accordance with some embodiments.

As shown on the display screen 410, a user may proceed with the importing process by selecting the "import" option 422. This in effect provides a confirmation to the data import module 303 to transition from the display screen 410 to the display screen 500 (shown in FIG. 5A). From the display screen 410, a user may select each dataset to view the field identifiers and field type information.

Figure 4B:
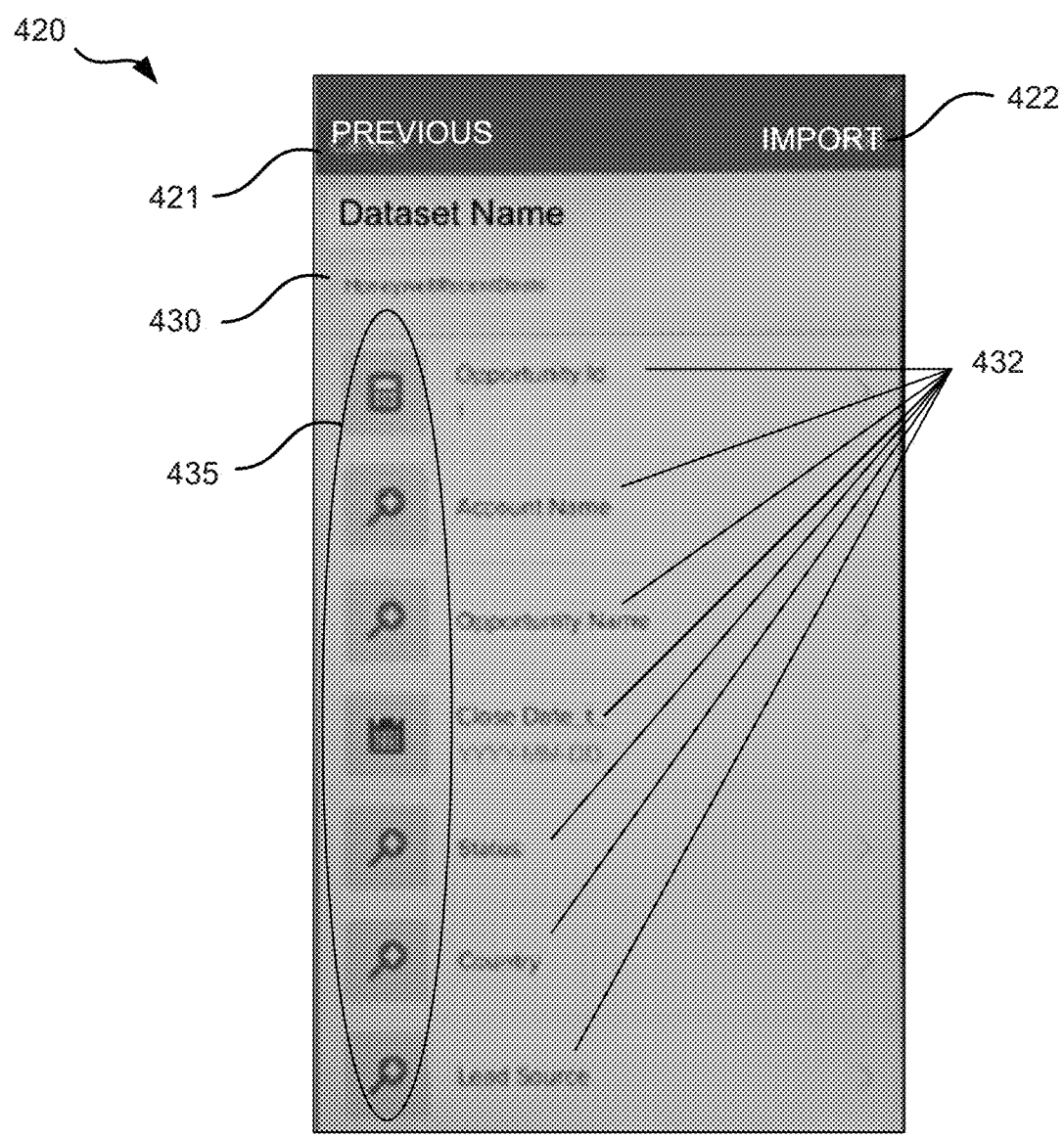
FIGS. 4B through 4F show examples of display screens of a mobile computing system that enable importing one dataset, in accordance with some embodiments.

FIG. 4B illustrates an example display screen associated with a dataset opened by the data import module, in accordance with some embodiments. When a dataset such as dataset 411 (shown in FIG. 4A) is selected, the data import module 303 may cause the import interface module 302 to display the display screen 420. The display screen 420 may include information about the dataset including the dataset name 430 and the field identifiers 432 representing the fields in the dataset.

For some embodiments, each field identifier may be associated with a field type. There may be a default set of field types. For example, the default set of field types may include "measure", "dimension" and "date" field types. The field types may be automatically determined by the data import module 303 for each field. Field type icon group 435 shows a field type for each field when the selected dataset is displayed in the display screen 420. It is possible that the data import module 303 may not be able to determine the field type for certain field using the default field types. A dataset error may be generated and displayed to enable selecting a proper field type that may not be in the default set of field types.

With the display screen 420, when the "previous" option 421 is selected, the data import module 303 may transition from the display screen 420 to the display screen 410 (shown in FIG. 4A) where another dataset may be selected. When the "import" option 422 is selected, the data import module 303 may transition from the display screen 420 to display screen 480 (shown in FIG. 4G) or display screen 500 (shown in FIG. 5A) where the importing of a dataset or multiple datasets may begin. For example, a user may select the "import" option 422 after determining that the displayed field identifiers and field type information are acceptable.

From the display screen 420 of FIG. 4B, a user may select a field identifier from the group of field identifiers 432 to view the format of that field. When this occurs, the data import module 303 may transition from the display screen 420 to the display screen 450 of FIG. 4C, which illustrates example format information about a field associated with the selected field identifier. In this example, the selected field identifier is "opportunity ID" 452, and its field type is "measure" 455. For some embodiments, the data import module 303 may provide field options to enable configuring a field type. A default field option may be preselected, but the field option may be updated. For example, a field option for the "measure" field type 455 may include the "precision" 458 for that field type. A pre-selected default precision in this example is "1" and its selection is represented by the check mark 454. The precision can be updated by selecting other values shown in the "precision" group 459. The precisions shown in "precision" group 459 in this example may range from 0.00001 to 1 with each increase corresponding to moving the decimal point one position to the right. Similar to providing the field options for the "measure" field type 455, the data import module 303 may provide field options to configure the "date" field type 457. For example, the field options for the "date" field type 457 may include different date formats for any combination of "year," "month," "day," "hour," "minute," and "second" such as: ddmmyy, mmddyy, yyyymmddhhmmss, yy-mm-dd hh:mm:ssz, etc.

For some embodiments, when a field type is determined by the data import module 303 for a particular field, the field type icon corresponding to that field type may be highlighted. In this example, "measure" field type icon 455 is highlighted. Similarly, display screen 460 in FIG. 4D highlights the "dimension" field type icon 456, and display screen 470 in FIG. 4E highlights the "date" field type icon 457. It may be noted that there are three unique field type icons, each corresponding to a unique field type such as, for example, "measure", "dimension" and "date." It may also be noted that, even though the above example refers to three unique field types, the number of field types may vary in some embodiments.

A user may elect to review the field type and modify the field option for one or more fields in the dataset. The user may optionally elect to accept the default field types and the field options for all the fields as determined by the data import module 303 without making any modification. This may enable the user to proceed with the import process and be able to view and explore the data in the dataset faster using the display screen of the mobile computing device. From the display screen 450, when the "cancel" option 453 is selected, the data import module 303 may transition from the display screen 450 back to the display screen 420 (shown in FIG. 4B) without saving any changes. When the "previ-ous" option 451 is selected, the data import module 303 may update any changes and transition from the display screen 450 back to the display screen 420. From the display screen 420, another field identifier may be selected.

Figure 4C:
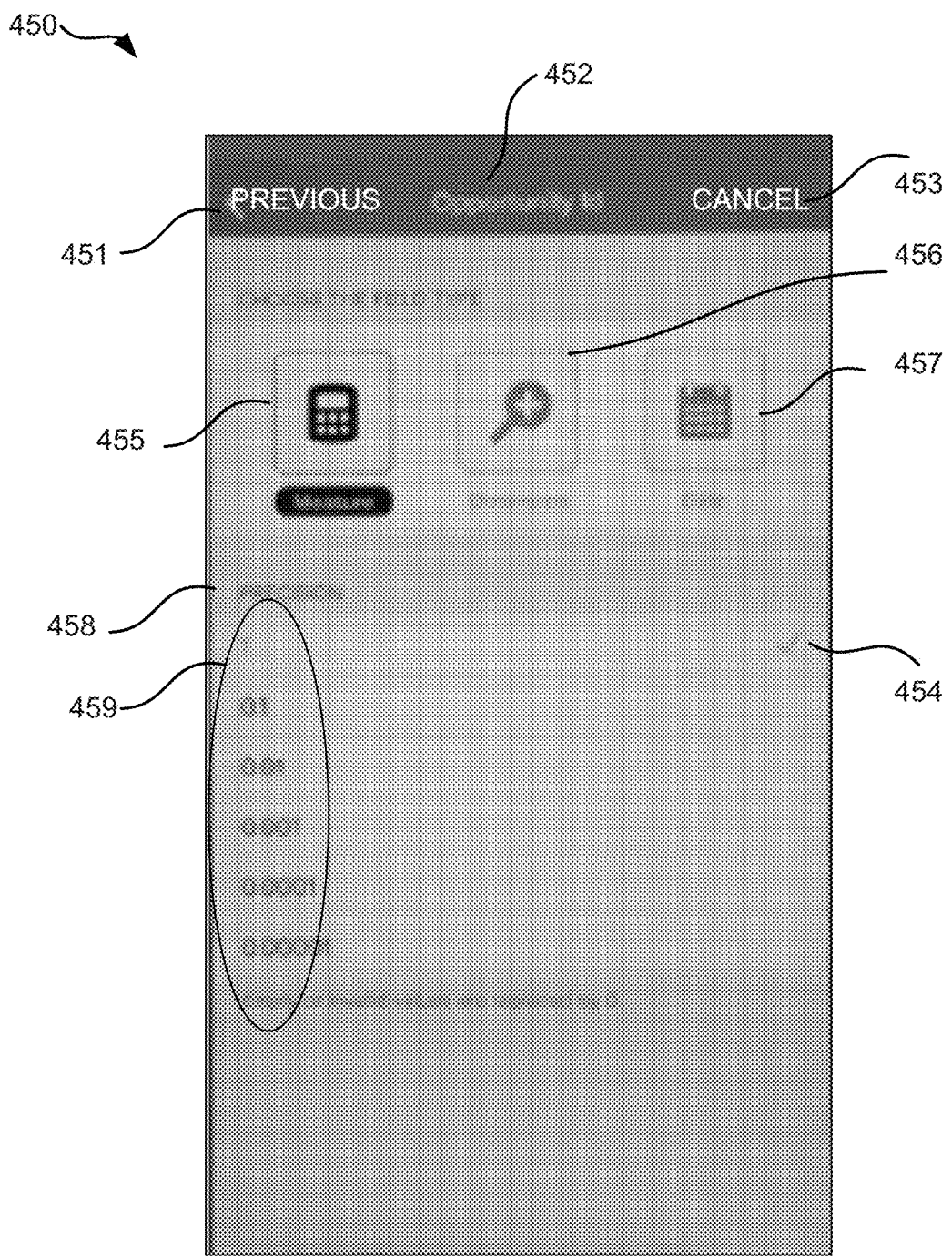
Figure 4D:
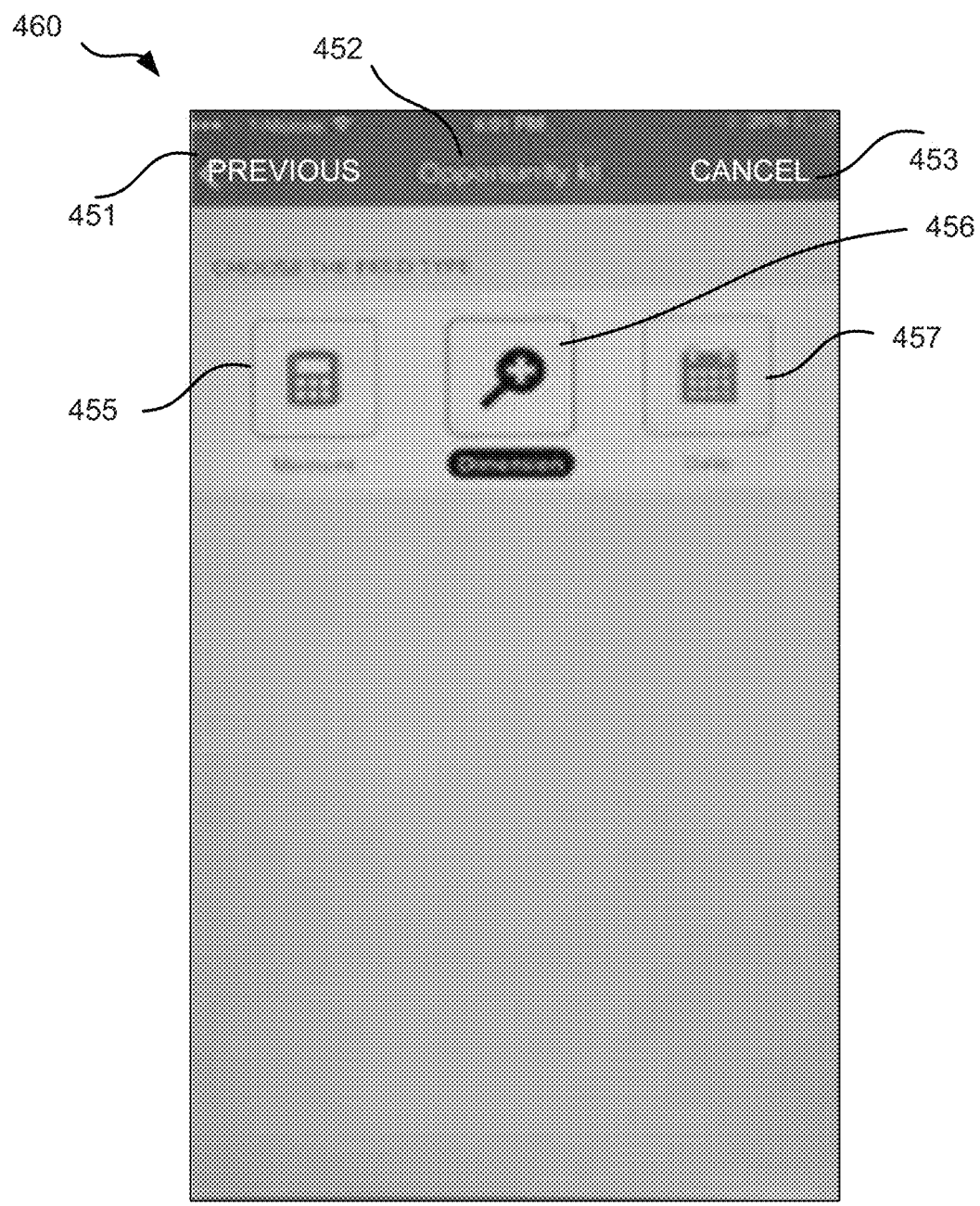
Figure 4E:
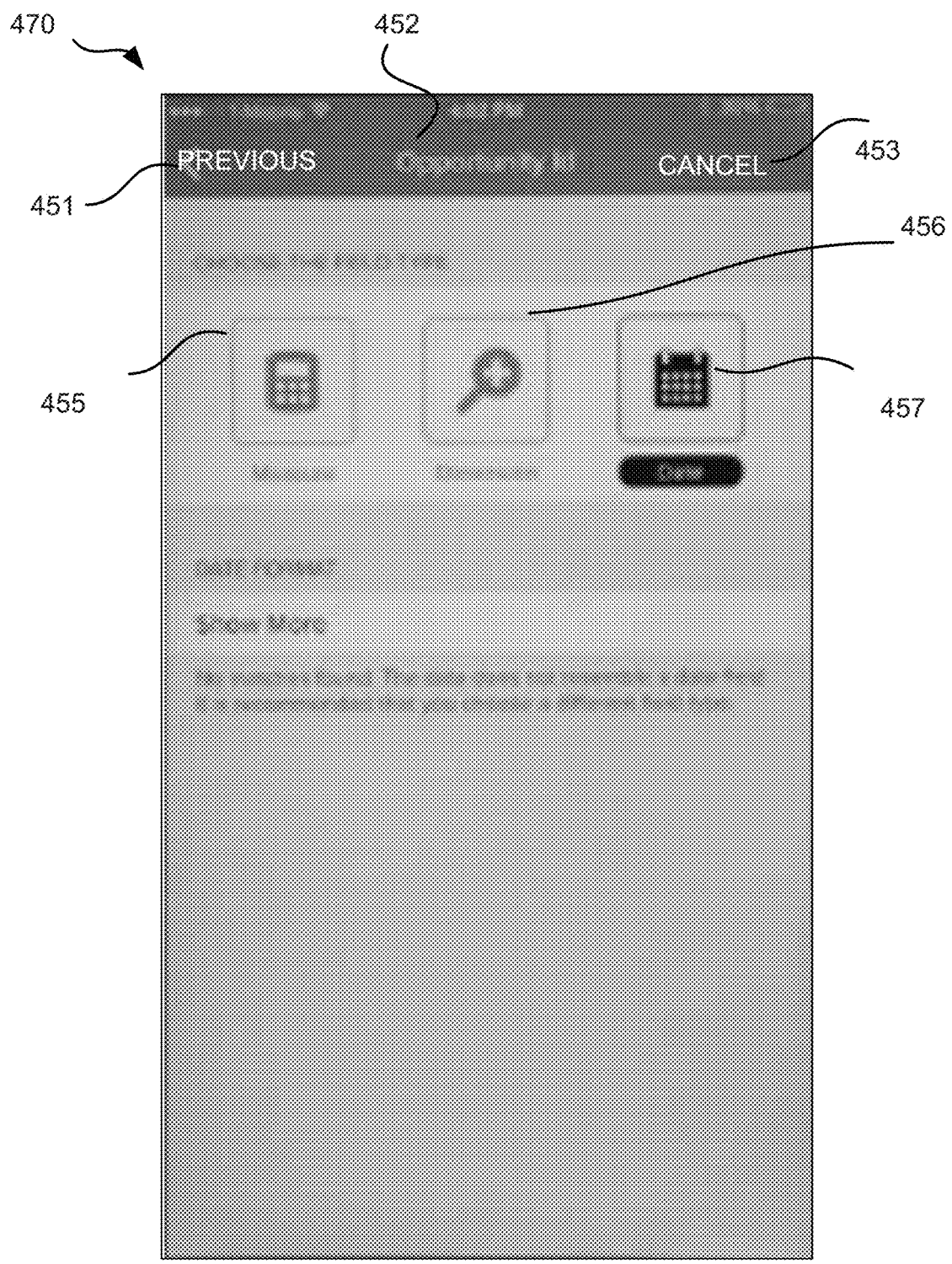
Figure 4F:
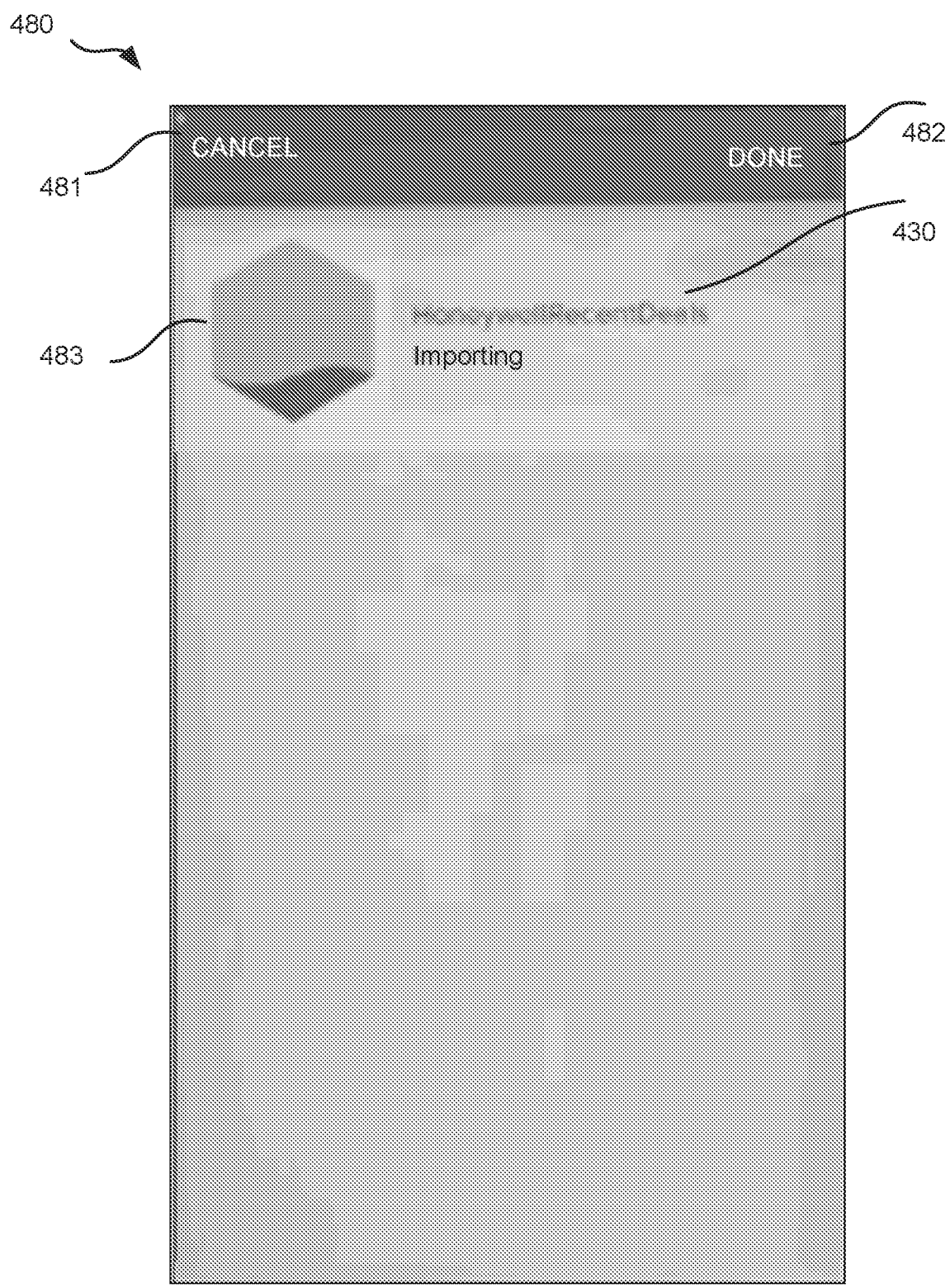

When there is only one dataset to be imported, selecting the "import" option 422 (shown in FIG. 4B) may cause the data import module 303 to transition from the display screen 420 to the display screen 480 of FIG. 4F where the importing process for the dataset 430 may begin. While the display screen 480 is shown, if the cancel option 481 is selected, the data import module 303 may cause the importing process to stop. The "done" status 482 (shown in FIG. 4F) may be greyed out while the importing process is in progress and may become more visible when the importing process is completed.

For some embodiments, the progress icon 483 (shown in FIG. 4F) may be configured as a widget that dynamically updates its content to reflect the current status of the importing process. For example, the progress icon 483 may be configured as a water line with the water content shown shaded and continuously increased to reflect the progress of the import process.

Figure 4G:
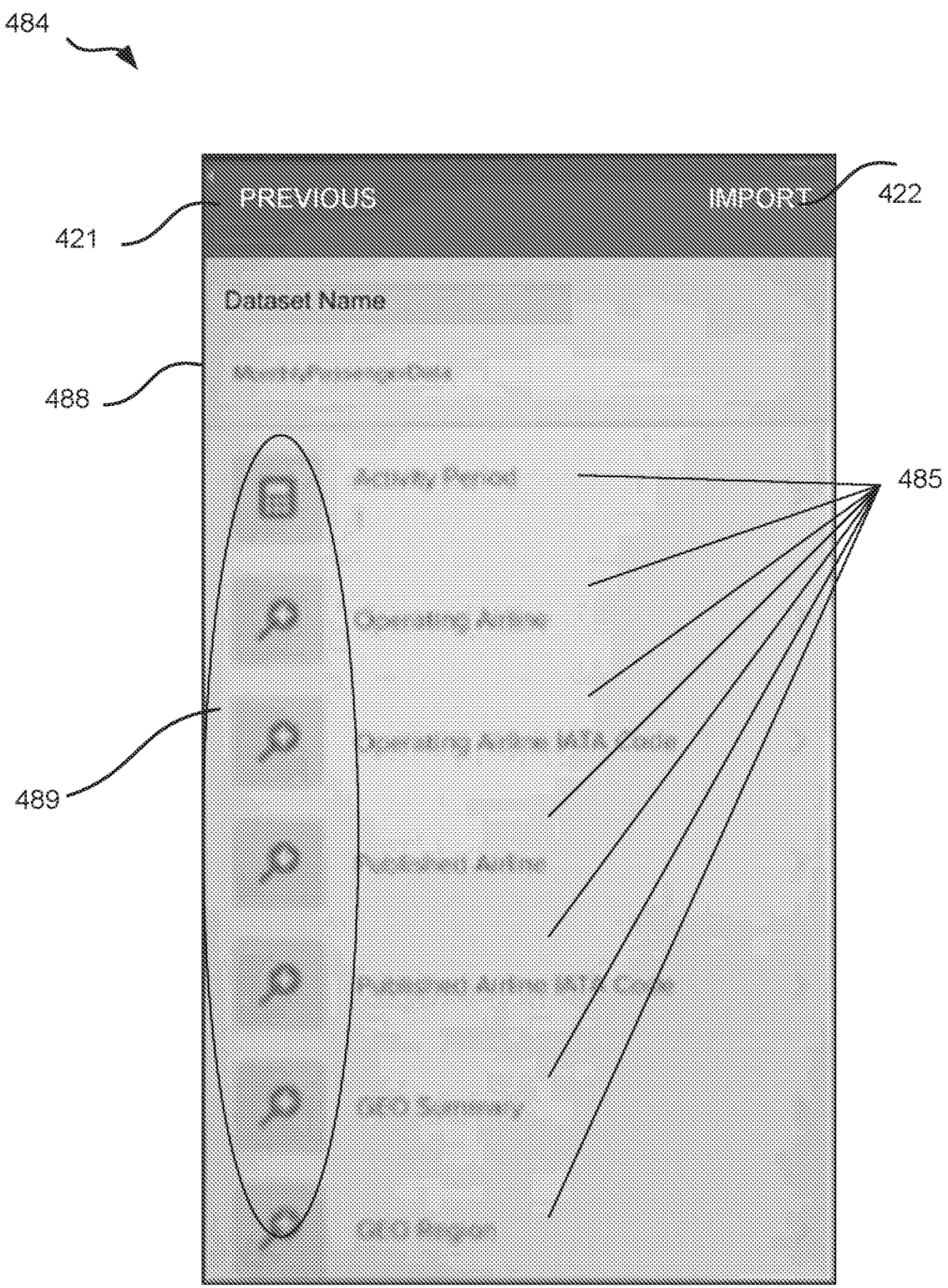
FIGS. 4G through 4H show examples of display screens of a mobile computing system that enable importing multiple datasets, in accordance with some embodiments.

When there are multiple datasets to be imported, the data import module 303 may enable a user to repeat the import process as shown in FIGS. 4B-4E for each dataset. For example, FIG. 4G illustrates a display screen 484 associated with a second dataset 488. The dataset 488 is associated with a group of field identifiers 485 and their corresponding field type icons 489. When the "previous" option 421 is selected, the data import module 303 may transition from the display screen 484 to the display screen 410 (shown in FIG. 4A) where another dataset may be selected. When the "import" option 422 is selected, the data import module 303 may transition from the display screen 484 to the display screen 500 (shown in FIG. 5A) where the importing of the multiple datasets may begin.

Figure 4H:
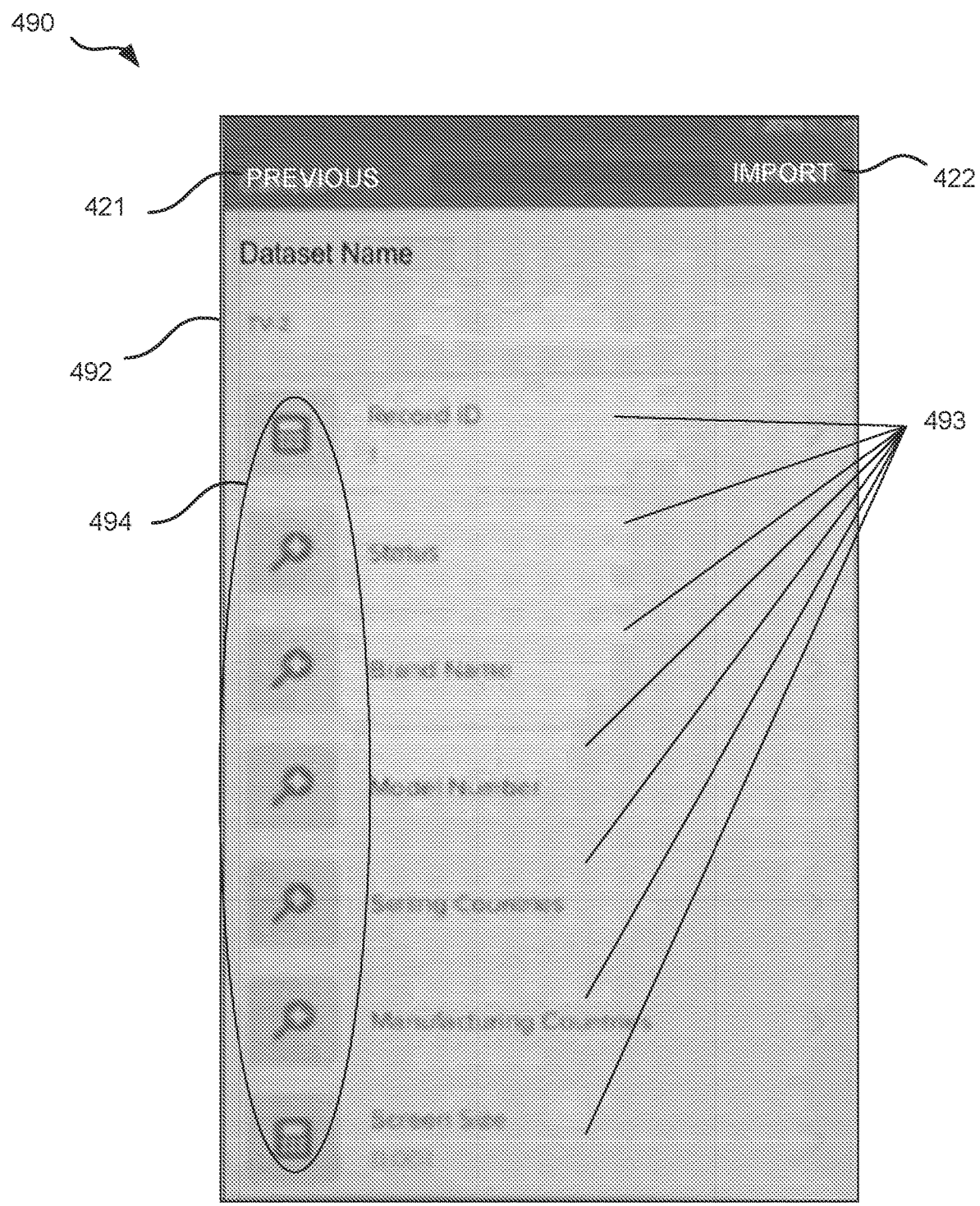
Figure 4I:
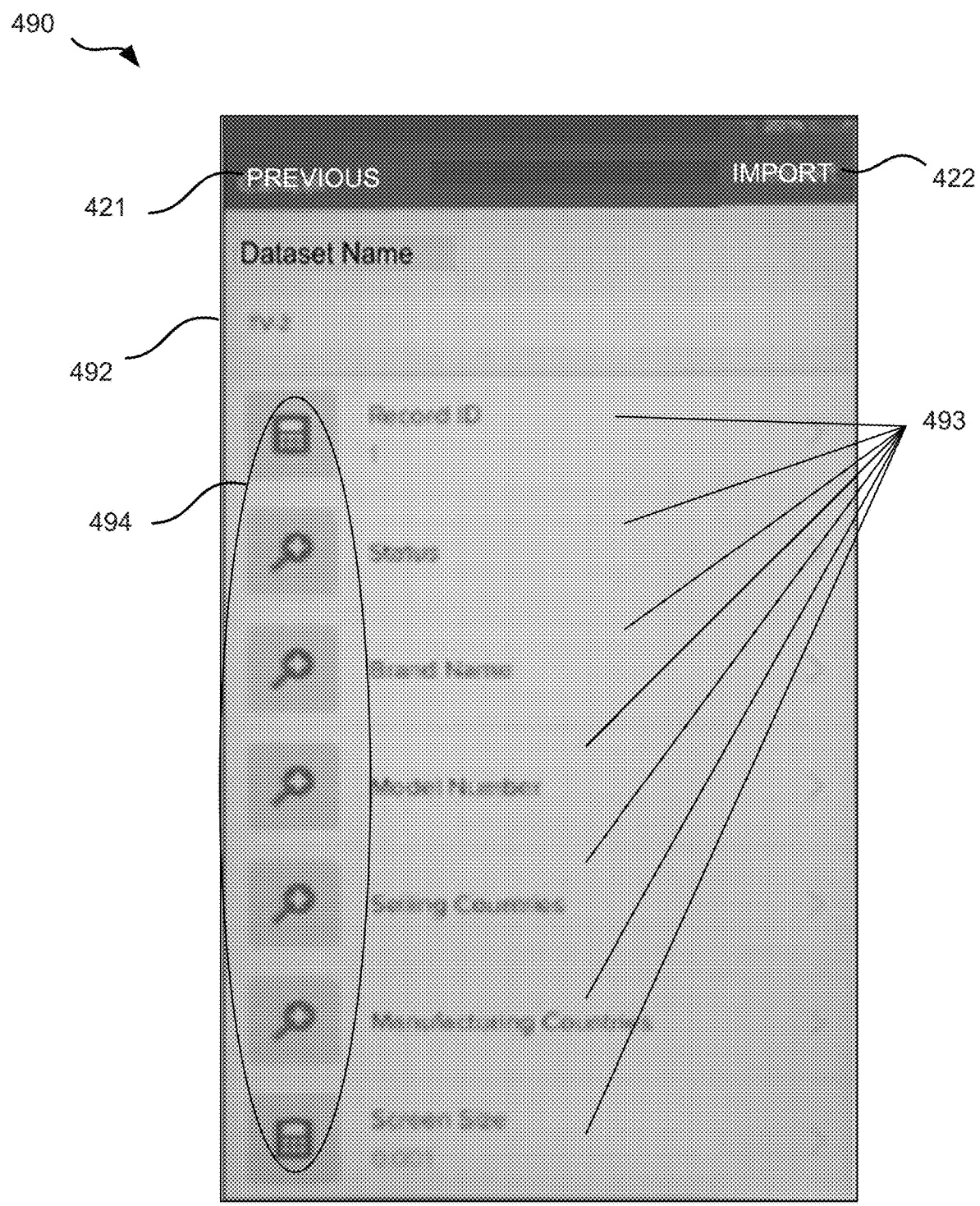

FIG. 4H illustrates a display screen 490 associated with a third dataset 492. The dataset 492 is associated with a group of field identifiers 493 and their corresponding field type icons 494. When the "previous" option 421 is selected, the data import module 303 may transition from the display screen 490 to the display screen 410 (shown in FIG. 4A) where another dataset may be selected. When the "import" option 422 is selected, the data import module 303 may transition from the display screen 490 to the display screen 500 (shown in Figure 5A) where the importing of the multiple datasets may begin.

Figure 5B:
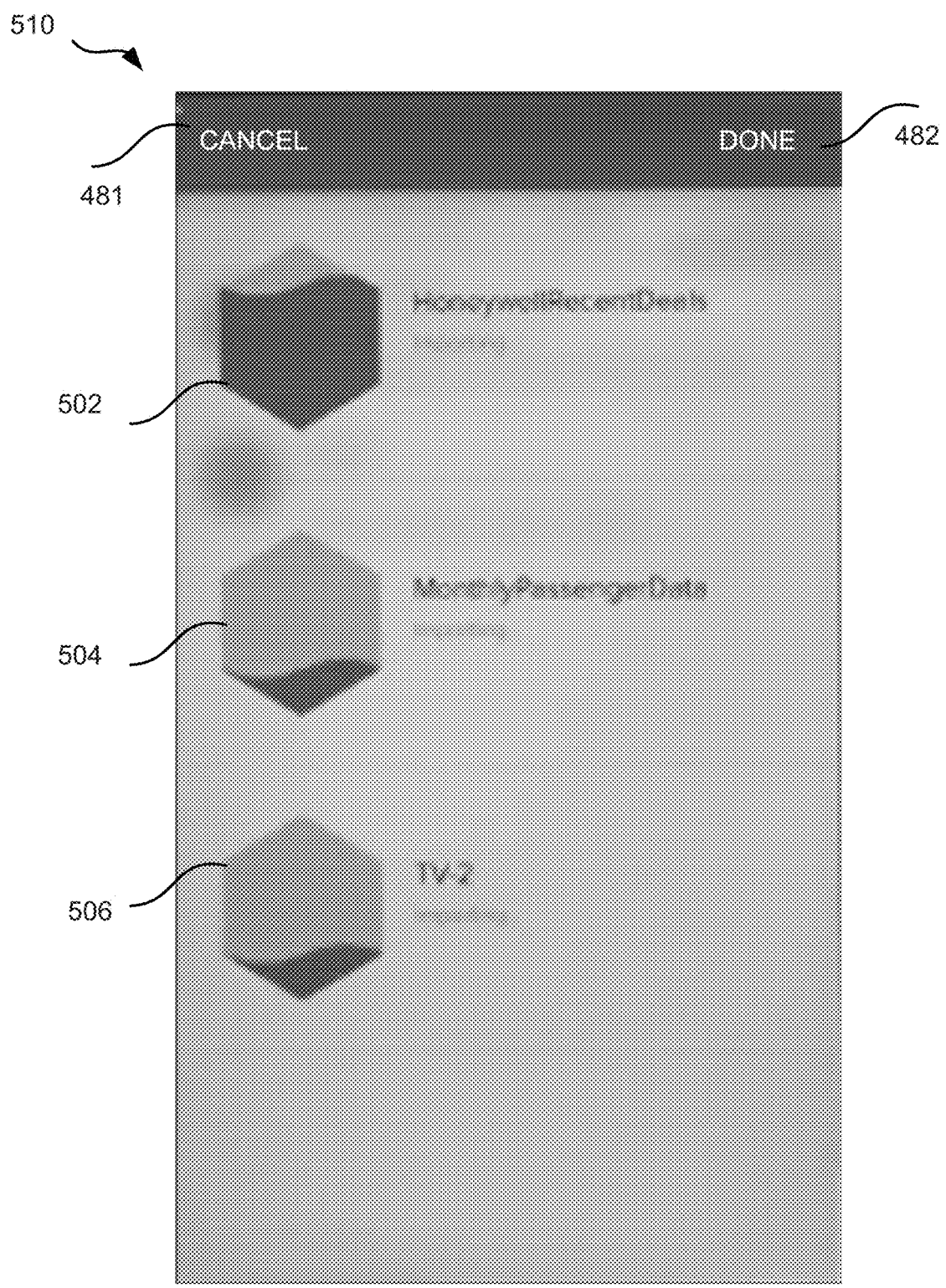
Figure 5C:
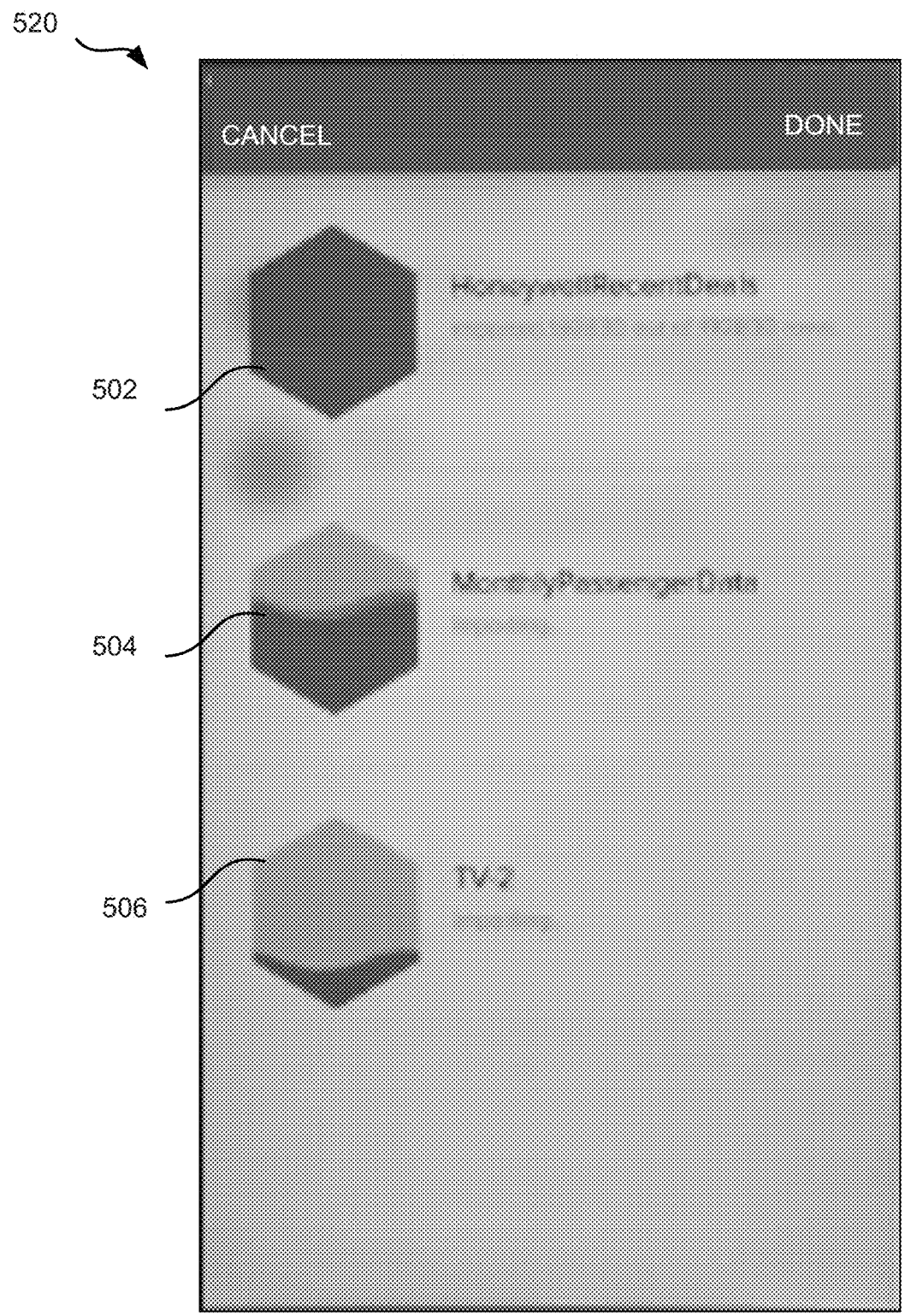
Figure 5D:
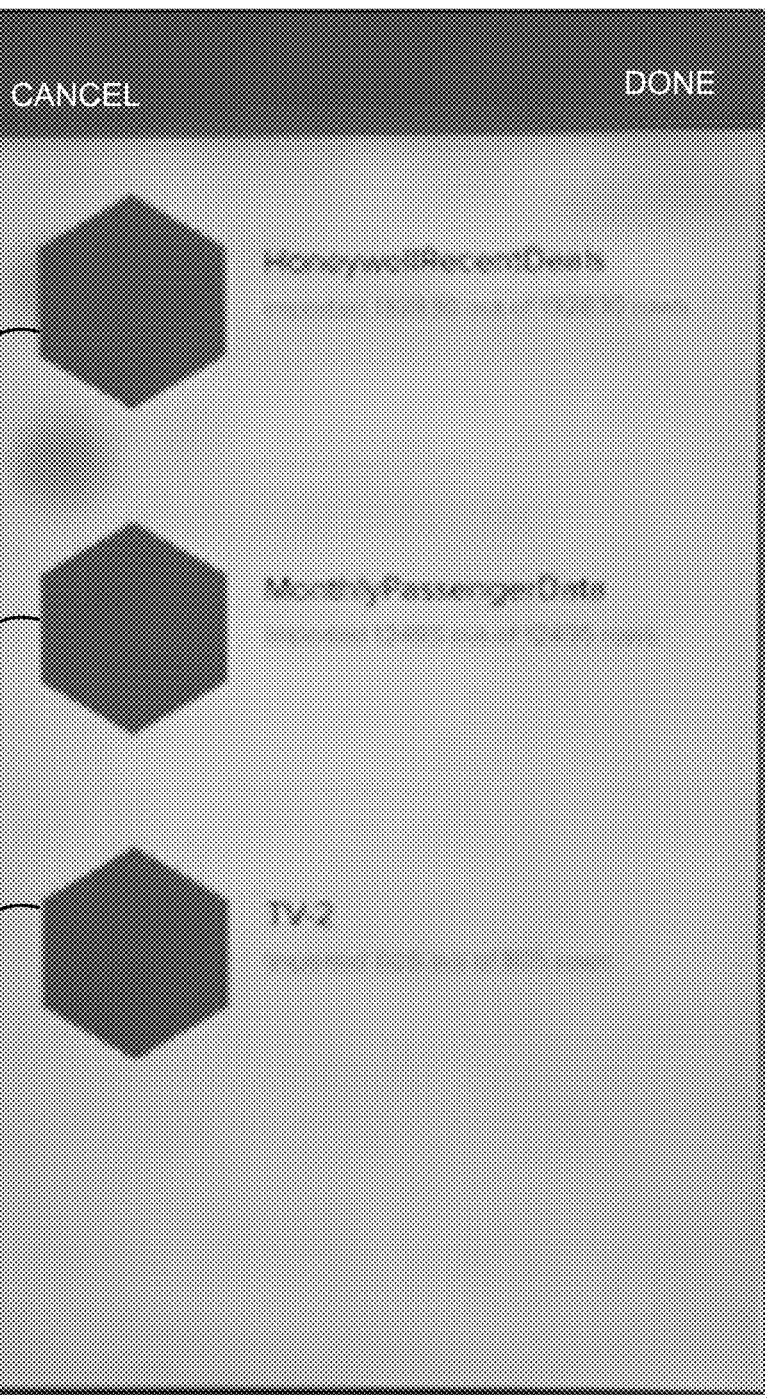

The display screen 500 shows three progress icons 502, 504 and 506, each corresponding to a dataset to be imported. Similar to the progress icon 483 (shown in FIG. 4F), these progress icons are dynamically updated to reflect the importing progress. FIG. 5B shows another example of the progress icons 502, 504 and 506 with a more updated status of the importing process. FIG. 5C shows yet another example of the progress icons 502, 504 and 506 with the import of the first dataset having been completed. FIG. 5D shows an example of the progress icons 502, 504 and 506 with the import of the three datasets having been completed and the progress icons 502, 504 and 506 completely shaded.

For some embodiments, after the datasets have been successfully imported, the data in the datasets may be viewed using a graphical user interface. For example, from the list of datasets shown on the display screen 550, a dataset such as the dataset 502 can be selected to cause its field identifiers to be displayed. Examples of the field identifiers are shown in FIGS. 4B, 4G and 4H. For some embodiments, a field identifier may be associated with a widget to display the data associated with the field identifier according to how the widget is configured. The term "widget" may refer to a simple application that is designed to perform a specific task such as, for example, displaying data in a certain chart format. There may be multiple widgets, and each may perform a different task. A widget may be a reusable component and may be used with other widgets to form a more complex graphical user interface.

Figure 6A:
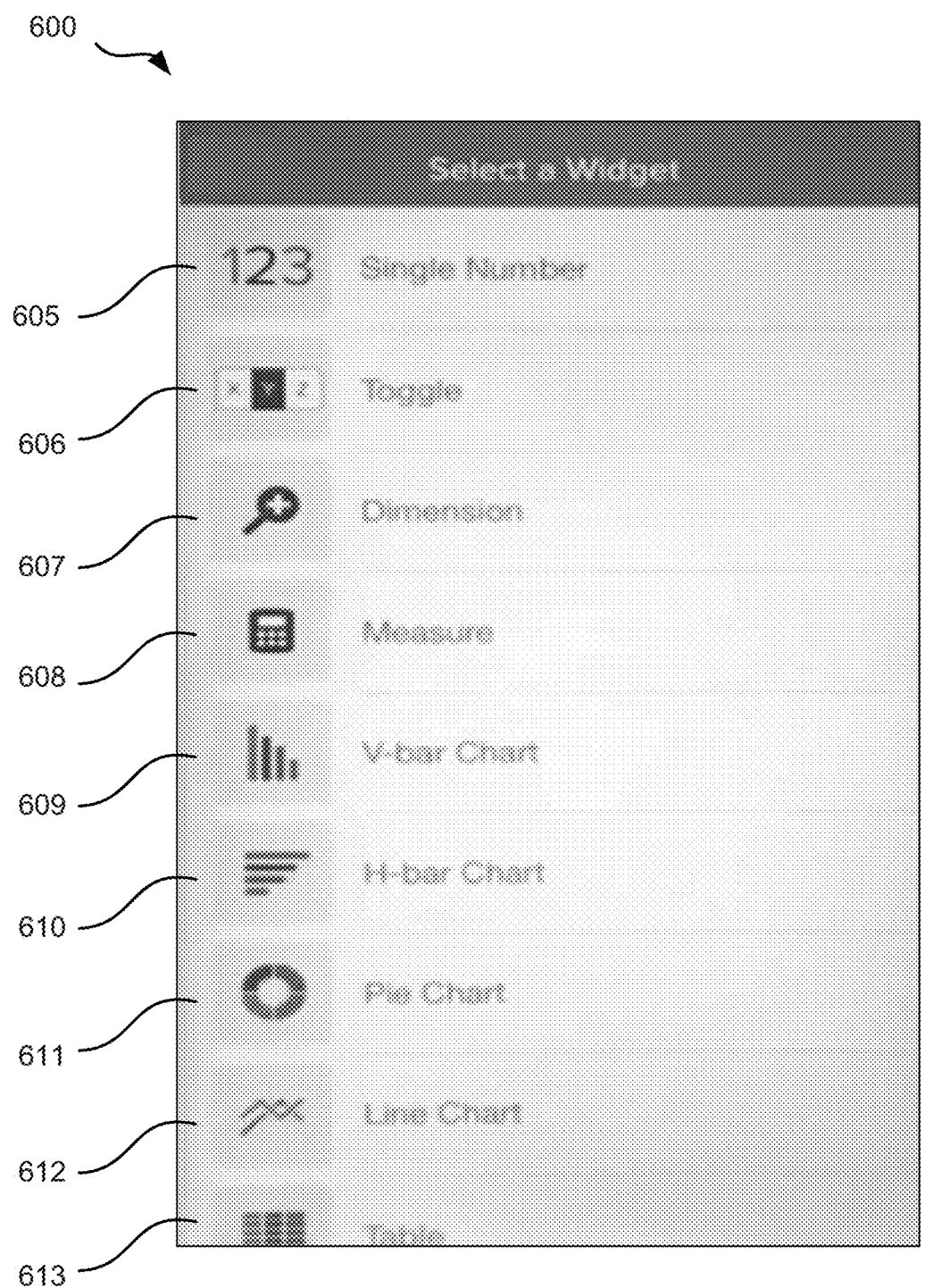
FIGS. 6A through 6B show examples of widgets that may be used to view data in the imported datasets, in accordance with some embodiments.
Figure 6B:
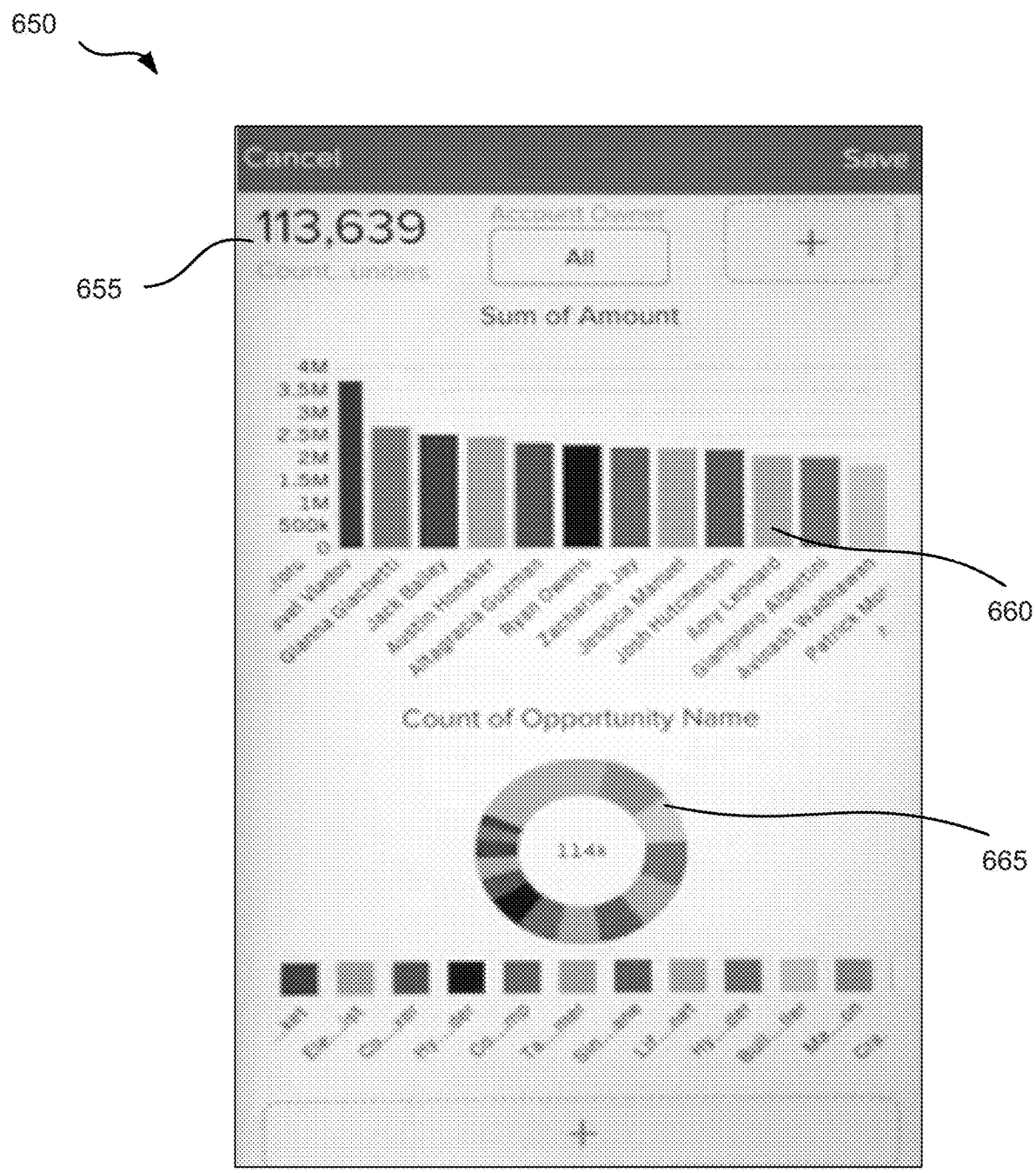

FIG. 6A illustrates an example widget display screen, in accordance with some embodiments. Widget display screen 600 may display a collection of widgets that can be used to view the data in the imported datasets. In this example, the collection of widgets may include "single number" widget 605, "toggle" widget 606, "dimension" widget 607, "measure" widget 608, "vertical bar chart" widget 609, "horizontal bar chart" widget 610, "pie chart" widget 611, "line chart" widget 612, and "table" widget 613. The number of widgets to be displayed may not be limited to those shown in the widget display screen 600. For some embodiments, the widgets may be available in a widget library associated with the server computing system 255, and may be downloaded to the computing system that is used to view the data in the imported dataset. The list of widgets may be scrollable to view all of the available widgets. FIG. 6B illustrates an example of a graphical user interface that displays data in an imported dataset using multiple widgets, in accordance with some embodiments. Display screen 650 shows a single number value 655 which may be a sum of values associated with a field identifier. Display screen 650 also shows a vertical bar chart 660 and a pie chart 665 which may represent values associated with several field identifiers.

For some embodiments, the information displayed by the different widgets may be scrollable. For example, the vertical bar chart 660 may be scrolled horizontally to display information that may not be visible. For some embodiments, when a particular portion of the vertical bar chart information 660 is selected, more detailed information about that portion may be displayed. Similarly, the pie chart 665 may be rotated and a pie section may be selected to view more detailed information. For some embodiments, the information displayed by the different widgets on the same display screen may be dynamically linked to one another so that there is display consistency among the widgets.

Figure 7:
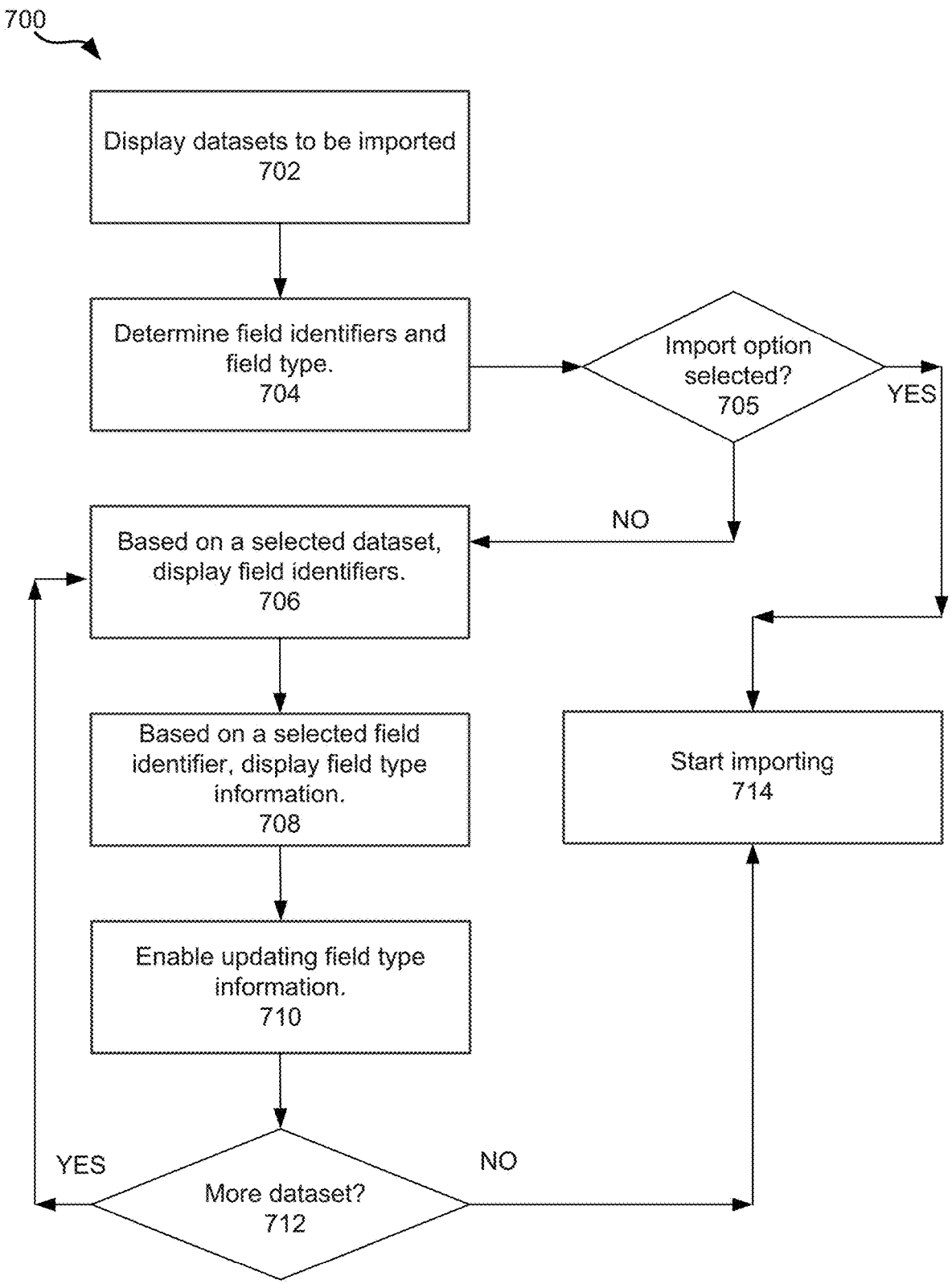
FIG. 7 shows a flowchart of an example process for importing datasets when using a mobile computing system, performed in accordance with some embodiments.

FIG. 7 shows a flowchart of an example process for importing datasets using a mobile computing system, performed in accordance with some embodiments. The process 700 may be performed by the data import module 303 (shown in FIG. 3) and is described based on a user or a software initiating an action to cause one or more dataset to be imported.

At block 702, the data import module 303 may display one or more datasets to be imported. An example is shown in FIG. 4A. The one or more datasets may be CSV datasets. The data import module 303 may analyze the one or more datasets to determine their associated field identifiers and field type information, as shown in block 704. The operations shown in blocks 702 and 704 may not necessarily be in the sequence shown.

At block 705, a decision may be made to determine whether the user decides to proceed with the importing process. For example, the user may select the "import" option 422 shown in FIG. 4A. If it is determined that the user elects to proceed with the importing process, the flow diagram may proceed to block 714 to start importing. The transition from block 704 to blocks 705 and 714 is applicable whether there is one dataset or multiple datasets. From the block 705, if the data import module 303 detects that the user wants to view the field identifiers of a particular dataset, the flow diagram may proceed to block 706 where the field identifiers are displayed. Several examples are shown in FIGS. 4F, 4G and 4H. The user may select a field identifier to view field type information. When this happens, the flow diagram may proceed to block 708 where the field type information for the selected field identifier is displayed. An example is shown in FIG. 4C. At block 710, the data import module 303 may enable the field type information to be updated.

At block 712, a decision may be made to determine whether the user decides to repeat the above operations with another dataset or to proceed with the importing process. For example, the user may try to import multiple datasets and may want to view the field identifiers of another dataset. If it is determined that the user elects to proceed with the importing process, the flow diagram may proceed to block 714 to start importing. If it is determined that the user elects to select another dataset, the flow diagram may proceed to block 706. The transition from block 712 to block 714 is applicable whether there is one dataset or multiple datasets, and the user may bypass selecting another dataset when there are multiple datasets. After the importing process for all the datasets is completed, the user may use a graphical user interface to view the data in the imported datasets. Depending on the field type information associated with the field identifiers of an imported dataset, a user may view and analyze the data by interacting with the widgets.

Figure 8A:
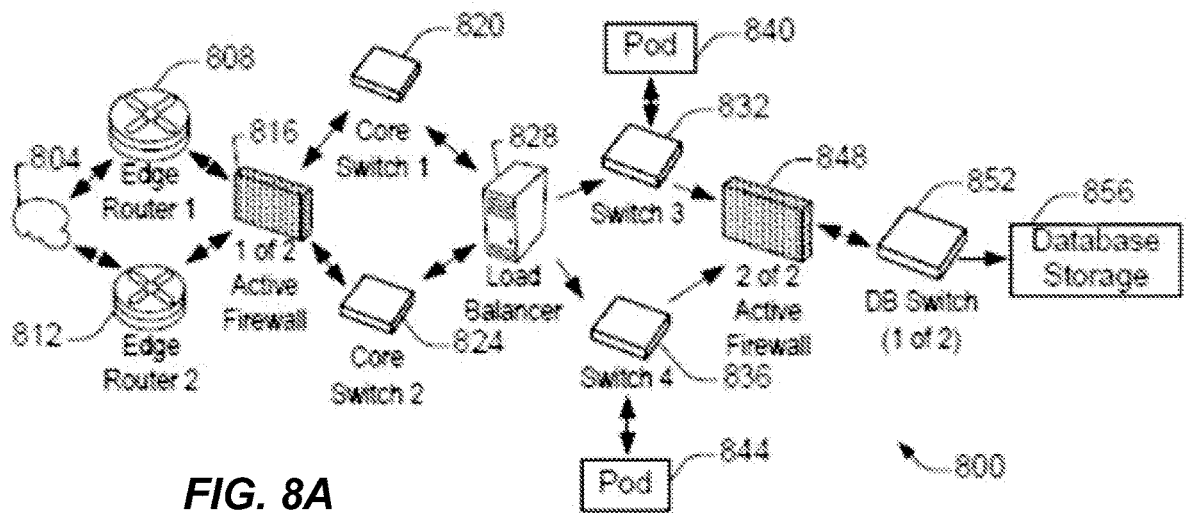
FIG. 8A shows a system diagram 800 illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
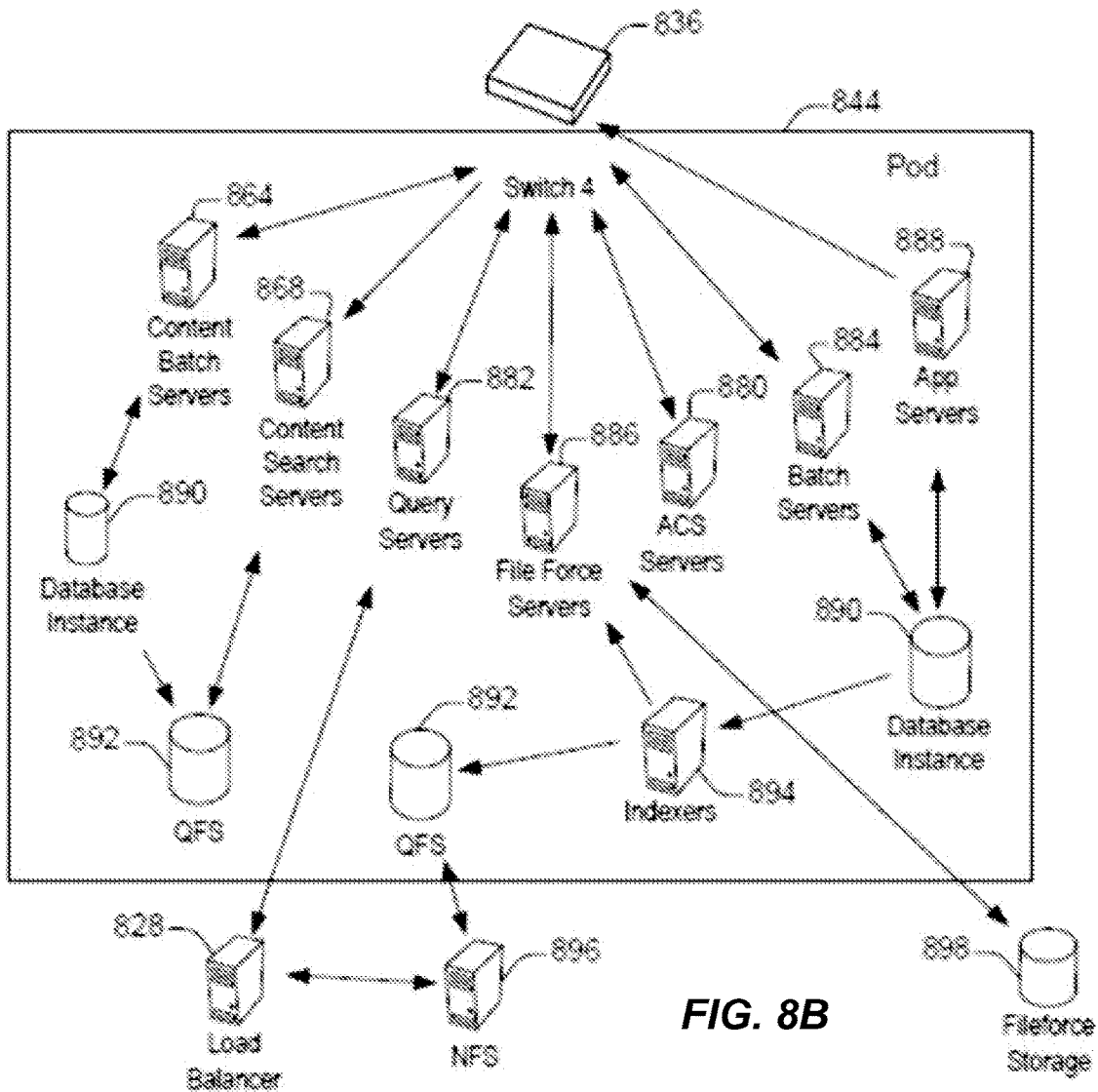
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
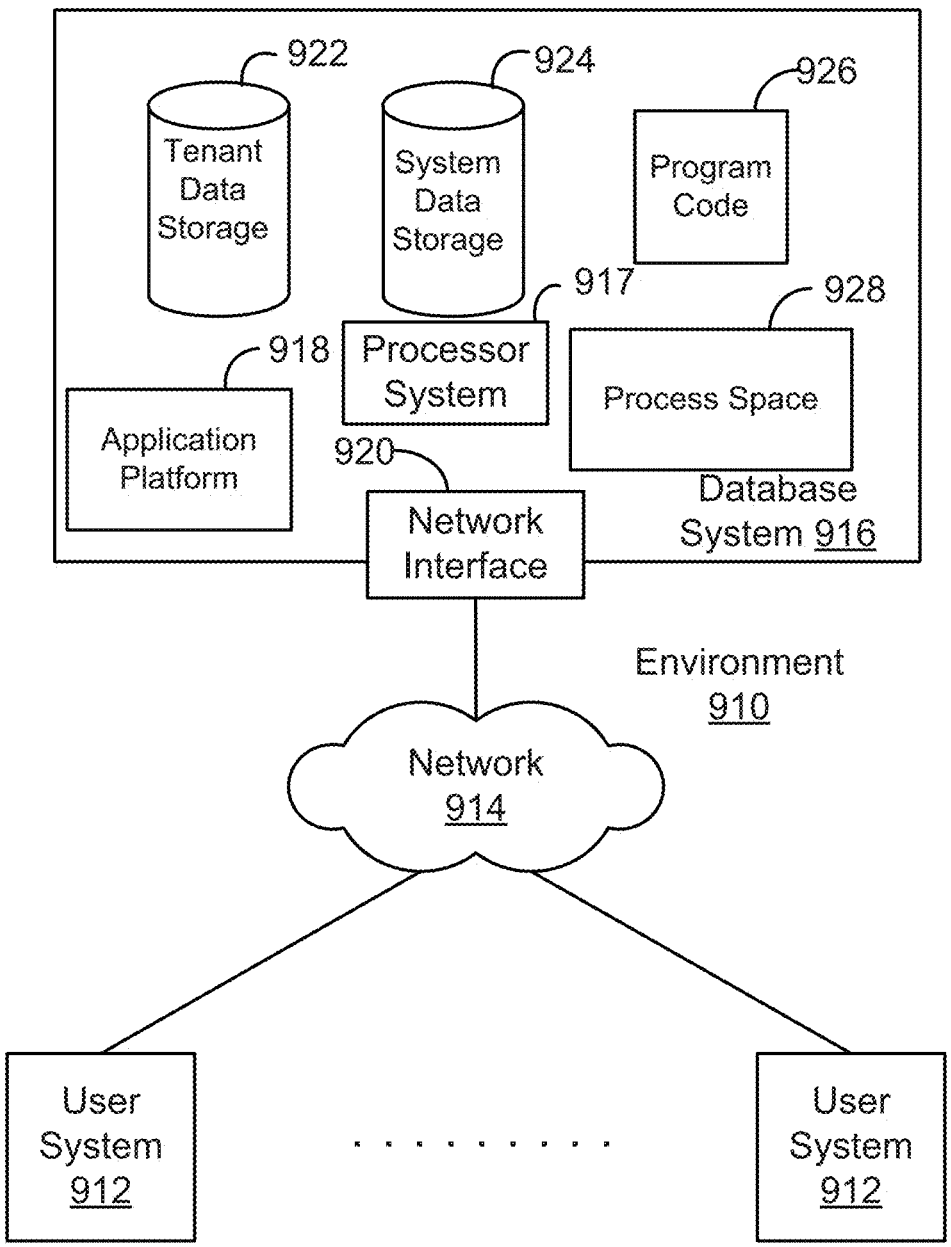
FIG. 9 shows a system diagram 910 illustrating the architecture of a multitenant database environment, in accordance with some embodiments.
Figure 10:
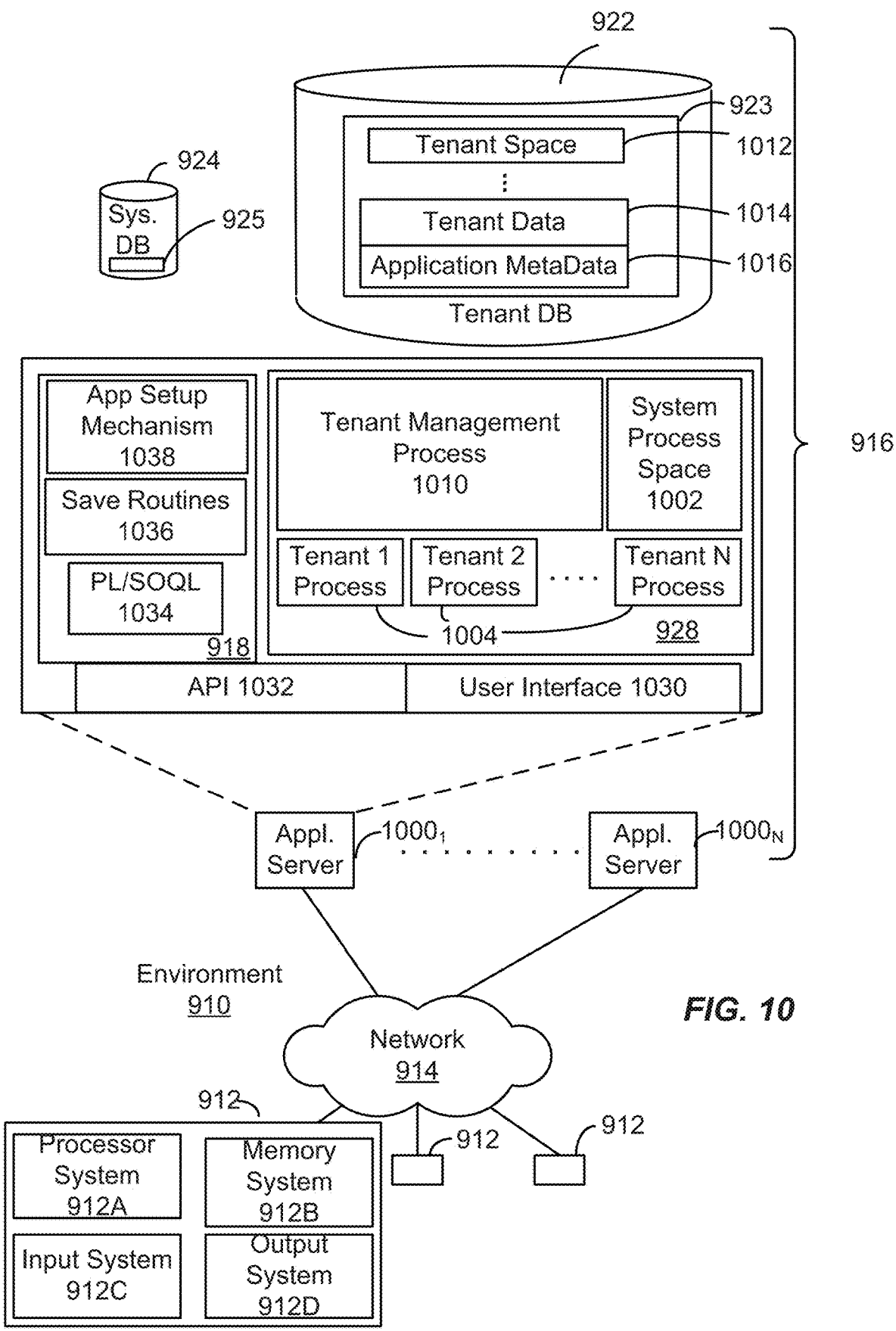
FIG. 10 shows a system diagram 910 further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method for importing data using a display screen of a mobile computing system, the method comprising:
   receiving a selection of a first dataset and a second dataset;
   determining field identifiers representing fields in the selected first dataset and second dataset, the first and second datasets pending confirmation to be imported into the mobile computing system;
   determining field type information associated with each of the determined field identifiers in the first dataset and the second dataset by analyzing of data stored in each of the fields represented by the determined field identifiers, each of the field type information being a classification that specifies a type of value of the data stored in each of the corresponding fields, the classification being a default field type of a set of default field types;
   causing each of the field identifiers and associated field type information to be displayed on the mobile computing system display screen before displaying any value stored by the fields of the first and second datasets;
   updating a field option associated with a field type information associated with a selected field identifier in response to receiving a selection of a displayed field identifier, the field option being a formatting configuration of data stored in the field associated with the selected field identifier; and
   importing the first and second datasets into the mobile computing system by using the determined field identifiers, associated field type information and the updated field option in response to receiving confirmation to import the first and second datasets, the value of all the data stored by the fields in the first and second datasets being in a format associated with the corresponding field type information and the updated field option, wherein the confirmation is received in response to a request to import by the user of the mobile computing system.

2. The method of claim 1, further comprising enabling the field type information to be updated before importing the first dataset.

3. The method of claim 2, wherein updating the field type information comprises using a field type not included in the set of default field types.

4. The method of claim 2, wherein updating the field type information comprises updating the field option associated with the field type.

5. The method of claim 4, wherein the field option is updated from its default value.

6. The method of claim 1, wherein displaying the one or more field identifiers and associated field type information comprises displaying a field type icon for each field type using the graphical user interface.

7. The method of claim 1, wherein the first dataset is associated with an email attachment, and wherein determining the one or more field identifiers and associated field type information for the one or more fields of the first dataset is initiated based on opening the email attachment.

8. The method of claim 1, wherein the first dataset is a comma separated values (CSV) dataset.

9. An apparatus to import data using a display screen of a mobile computing system, the apparatus comprising:
a processor; and
one or more stored sequences of instructions which, when executed by the processor, cause the processor to:
receive a selection of a first dataset and a second dataset;
determine field identifiers representing fields in the selected first dataset and second dataset, the first and second datasets pending confirmation to be imported into the mobile computing system;
determine field type information associated with each of the determined field identifiers in the first dataset and the second dataset by analyzing of data stored in each of the fields represented by the determined field identifiers, each of the field type information being a classification that specifies a type of value of the data stored in each of the corresponding fields, the classification being a default field type of a set of default field types;
cause each of the field identifiers and associated field type information to be displayed on the mobile computing system display screen before displaying any value stored by the fields of the first and second datasets;
update a field option associated with a field type information associated with a selected field identifier in response to receiving a selection of a displayed field identifier, the field option being a formatting configuration of data stored in the field associated with the selected field identifier; and
import the first and second datasets into the mobile computing system by using the determined field identifiers, associated field type information and the updated field option in response to receiving confirmation to import the first and second datasets, the value of all the data stored by the fields in the first and second datasets being in a format associated with the corresponding field type information and the updated field option, wherein the confirmation is received in response to a request to import by the user of the mobile computing system.

10. The apparatus of claim 9, further comprising instructions to enable the field type information to be updated before importing the first dataset.

11. The apparatus of claim 10, wherein updating the field type information comprises using a field type not in the set of default field types.

12. The apparatus of claim 10, wherein updating the field type information comprises updating the field option associated with the field type.

13. The apparatus of claim 12, wherein the field option is updated from its default value.

14. The apparatus of claim 9, wherein displaying the one or more field identifiers and associated field type information comprises displaying a field type icon for each field type using the graphical user interface.

15. The apparatus of claim 9, wherein the first dataset is associated with an email attachment, wherein determining the one or more field identifiers and associated field type information for the one or more fields of the first dataset is initiated based on opening the email attachment, and wherein the first dataset is a comma separated values (CSV) dataset.

16. A computer program product comprising computer-readable program code to be executed by one or more processors when retrieved from a non-transitory computer-readable medium, the program code including instructions to:
receive a selection of a first dataset and a second dataset;
determine field identifiers representing fields in the selected first dataset and second dataset, the first and second datasets pending confirmation to be imported into the mobile computing system;
determine field type information associated with each of the determined field identifiers in the first dataset and the second dataset by analyzing of data stored in each of the fields represented by the determined field identifiers, each of the field type information being a classification that specifies a type of value of the data stored in each of the corresponding fields, the classification being a default field type of a set of default field types;
cause each of the field identifiers and associated field type information to be displayed on the mobile computing system display screen before displaying any value stored by the fields of the first and second datasets;
update a field option associated with a field type information associated with a selected field identifier in response to receiving a selection of a displayed field identifier, the field option being a formatting configuration of data stored in the field associated with the selected field identifier; and
import the first and second datasets into the mobile computing system by using the determined field identifiers, associated field type information and the updated field option in response to receiving confirmation to import the first and second datasets, the value of all the data stored by the fields in the first and second datasets being in a format associated with the corresponding field type information and the updated field option, wherein the confirmation is received in response to a request to import by the user of the mobile computing system.

* * * * *